(12) United States Patent
Takahashi et al.

(10) Patent No.: US 12,556,076 B2
(45) Date of Patent: Feb. 17, 2026

(54) VIBRATION ACTUATOR AND VIBRATION PRESENTING APPARATUS

(71) Applicants: Yuki Takahashi, Tokyo (JP); Tomoya Ishitani, Tokyo (JP); Junichi Hashino, Tokyo (JP); Soichi Sato, Tokyo (JP)

(72) Inventors: Yuki Takahashi, Tokyo (JP); Tomoya Ishitani, Tokyo (JP); Junichi Hashino, Tokyo (JP); Soichi Sato, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 927 days.

(21) Appl. No.: 17/584,434

(22) Filed: Jan. 26, 2022

(65) Prior Publication Data

US 2022/0247292 A1 Aug. 4, 2022

(30) Foreign Application Priority Data

Jan. 29, 2021 (JP) .................... 2021-013947

(51) Int. Cl.
*H02K 33/02* (2006.01)
*G06F 3/01* (2006.01)

(52) U.S. Cl.
CPC ............. *H02K 33/02* (2013.01); *G06F 3/016* (2013.01)

(58) Field of Classification Search
CPC ................................ H02K 33/02; G06F 3/016
USPC .......................................................... 310/17
See application file for complete search history.

(56) References Cited

U.S. PATENT DOCUMENTS

| | | |
|---|---|---|
| 2012/0313627 A1 | 12/2012 | Furukawa et al. |
| 2015/0169061 A1 | 6/2015 | Odajima et al. |
| 2018/0152090 A1* | 5/2018 | Umehara .............. H02K 33/02 |
| 2018/0239432 A1 | 8/2018 | Hwang et al. |
| 2018/0314357 A1 | 11/2018 | Klein et al. |
| 2020/0136488 A1 | 4/2020 | Takahashi et al. |

(Continued)

FOREIGN PATENT DOCUMENTS

| | | |
|---|---|---|
| EP | 2808764 | 12/2014 |
| EP | 3648321 | 5/2020 |

(Continued)

OTHER PUBLICATIONS

Supplementary European Search Report and the European Search Opinion Dated Aug. 9, 2023 From the European Patent Office Re. Application No. 23180946.8. (9 Pages).

(Continued)

*Primary Examiner* — Terrance L Kenerly
*Assistant Examiner* — Theodore L Perkins

(57) ABSTRACT

Provided is a vibration actuator including: a movable part that gives vibration to a vibration presenting part that receives a pressing operation; a vibration generating part that generates the vibration of the movable part in accordance with the pressing operation; a base part; and an elastic support part. The movable part includes: a load detecting part provided between a presentation-part side fixing part and a support-part side fixing part and detecting, as a load, strain due to the pressing operation; and a movement regulating part provided on a side of the presentation-part side fixing part rather than the load detecting part. The movement regulating part regulates movement of the movable part by engaging with an engaged part of the base part via a buffer member when the movable part moves in a direction separating from the base part.

11 Claims, 20 Drawing Sheets

(56) References Cited

U.S. PATENT DOCUMENTS

2021/0240272 A1    8/2021   Tominaga et al.
2022/0247292 A1    8/2022   Takahashi et al.

FOREIGN PATENT DOCUMENTS

| | | |
|---|---|---|
| JP | 2015-070729 | 4/2015 |
| JP | 2016-038797 | 3/2016 |
| JP | 2020-069447 | 5/2020 |
| JP | 2022-117327 | 8/2022 |
| KR | 10-2017-0021168 | 2/2017 |
| WO | WO 2020/213477 | 10/2020 |

OTHER PUBLICATIONS

European Search Report and the European Search Opinion Dated Jul. 24, 2025 From the European Patent Office Re. Application No. 25174729.1. (7 Pages).
Notice of Reasons for Rejection Dated Oct. 14, 2025 From the Japan Patent Office Re. Application No. 2025-034851 and its Translation Into English. (6 Pages).

* cited by examiner

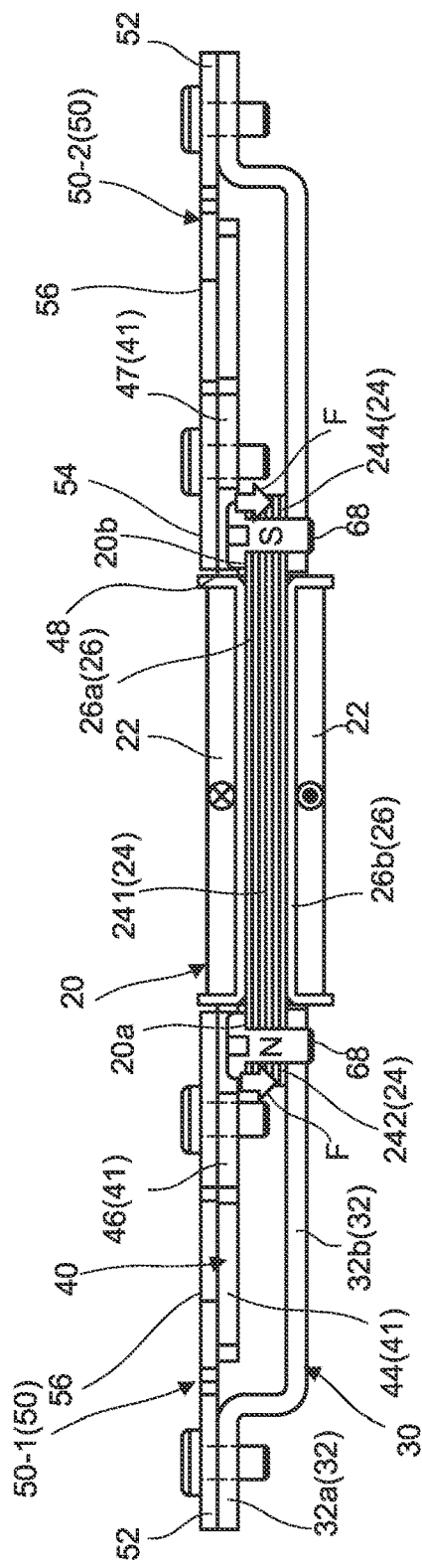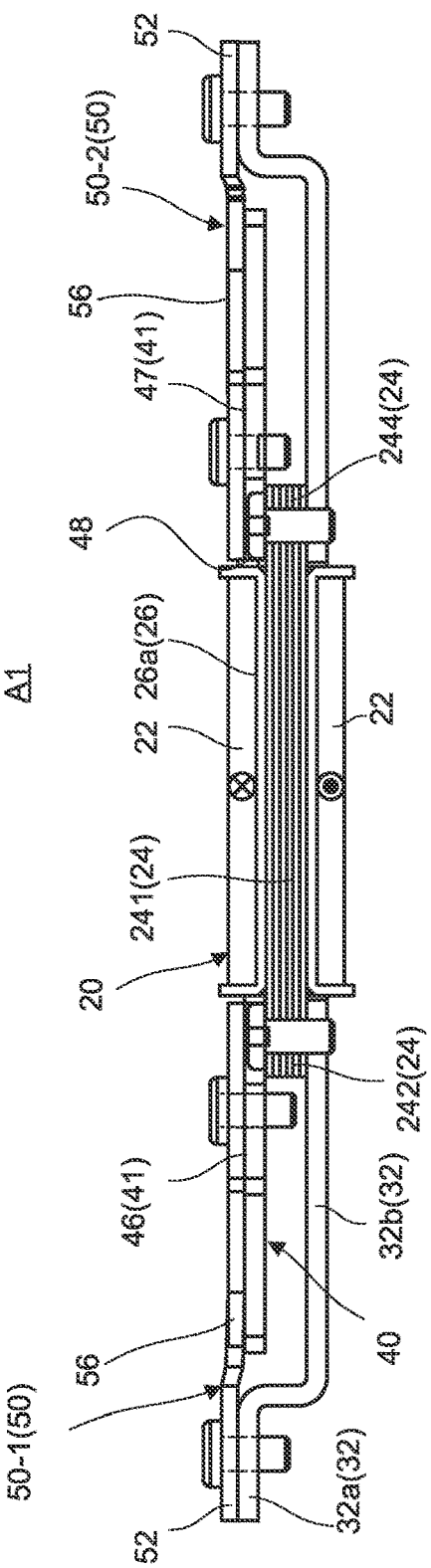

VIBRATION ACTUATOR AND VIBRATION PRESENTING APPARATUS

CROSS REFERENCE TO RELATED APPLICATIONS

This application is entitled to (or claims) the benefit of Japanese Patent Application No. 2021-013947, filed on Jan. 29, 2021, the disclosure of which including the specification, drawings and abstract is incorporated herein by reference in its entirety.

TECHNICAL FIELD

The present invention relates to a vibration actuator that gives vibration corresponding to a pressing operation, and a vibration presenting apparatus including the vibration actuator.

BACKGROUND ART

In the related art, there is known a configuration in which a vibration actuator gives vibration as a contact operation feeling (a feeling of operation by contact) to a finger pulp or the like of an operator that comes into contact with a display screen displayed on a touch screen as a sensing screen (see Patent Literature (hereinafter, referred to as "PTL") 1).

PTL 1 discloses a portable terminal apparatus in which a vibration actuator is attached to the rear surface of a touch screen via a vibration transmitting part. In the vibration actuator of the apparatus, a movable element is disposed inside a housing fixed to the vibration transmitting part so as to be reciprocatingly movable along a guide shaft disposed perpendicular to the touch screen. The vibration actuator gives vibration to a finger pulp that comes into contact with the touch screen via the vibration transmitting part by causing the movable element to collide with the housing in accordance with an operation on the touch screen although a sound of collision may be generated thereby.

CITATION LIST

Patent Literature

PTL 1
Japanese Patent Application Laid-Open No. 2015-070729

SUMMARY OF INVENTION

Technical Problem

Incidentally, in a vibration presenting apparatus that presents vibration corresponding to a pressing operation, a strong vibration or a strong impact from outside may continue as vibration in accordance with an application and a use situation of an operation device. It is known, on the other hand, that a vibration presenting apparatus requires detection of a pressing operation on the screen. In a case where a strong impact on a vibration presenting apparatus continues, a sound of collision is frequently generated as well as an excessive stress is applied to a sensor, which may cause a failure and require maintenance such as repair and replacement in a short period.

An object of the present invention is to provide a vibration actuator and a vibration presenting apparatus that are capable of achieving an improved impact resistance and a reduced sound.

Solution to Problem

To achieve the above-described object, a vibration actuator of the present invention includes: a movable part that gives vibration to a vibration presenting part that receives a pressing operation; a vibration generating part that generates the vibration of the movable part in accordance with the pressing operation; a base part; and an elastic support part that supports the movable part with respect to the base part in a vibratable manner in an approaching/separating direction. The movable part includes: a load detecting part provided between a presentation-part side fixing part and a support-part side fixing part and detecting, as a load, strain due to the pressing operation, where the presentation-part side fixing part is fixable to the vibration presenting part and the support-part side fixing part is fixed to the elastic support part; and a movement regulating part provided on a side of the presentation-part side fixing part rather than the load detecting part. The movement regulating part regulates movement of the movable part by engaging with an engaged part of the base part via a buffer member when the movable part moves in a direction separating from the base part.

A vibration presenting apparatus of the present invention includes: the vibration actuator; and a touch screen as the vibration presenting part.

Advantageous Effects of Invention

According to the present invention, it is possible to achieve an improved impact resistance and a reduced sound.

BRIEF DESCRIPTION OF DRAWINGS

FIGS. 15A and 15B are diagrams provided for describing an operation of the actuator main body;

DESCRIPTION OF EMBODIMENTS

Hereinafter, embodiments of the present invention will be described in detail with reference to the accompanying drawings.

Embodiment 1

In the present embodiment, an orthogonal coordinate system (X, Y, Z) will be used for description. The drawings to be described later are also illustrated with the common orthogonal coordinate system (X, Y, Z). Hereinafter, the width, height, and depth of vibration presenting apparatus 1 including vibration actuator 10 are lengths in the X, Y, and Z directions, respectively, and correspondingly the width, height, and length of vibration actuator 10 are also lengths in the X, Y, and Z direction, respectively. Further, the plus side in the Z direction is a direction in which vibration feedback is given to the operator, which will be described as "front surface side" (or "upper side"). The minus side in the Z direction is a direction in which the operator performs pressing when performing an operation, which will be described as "back surface side" (or "lower side"). Note that, in each part forming vibration actuator 10, a surface on the "front surface side" (or "upper side") will be described as "front surface" (or "upper surface"), and a surface on the "back surface side" (or "lower side") will be described as "rear surface" (or "lower surface").

<Basic Configuration of Vibration Presenting Apparatus 1 Including Vibration Actuator 10>

Figure 1:
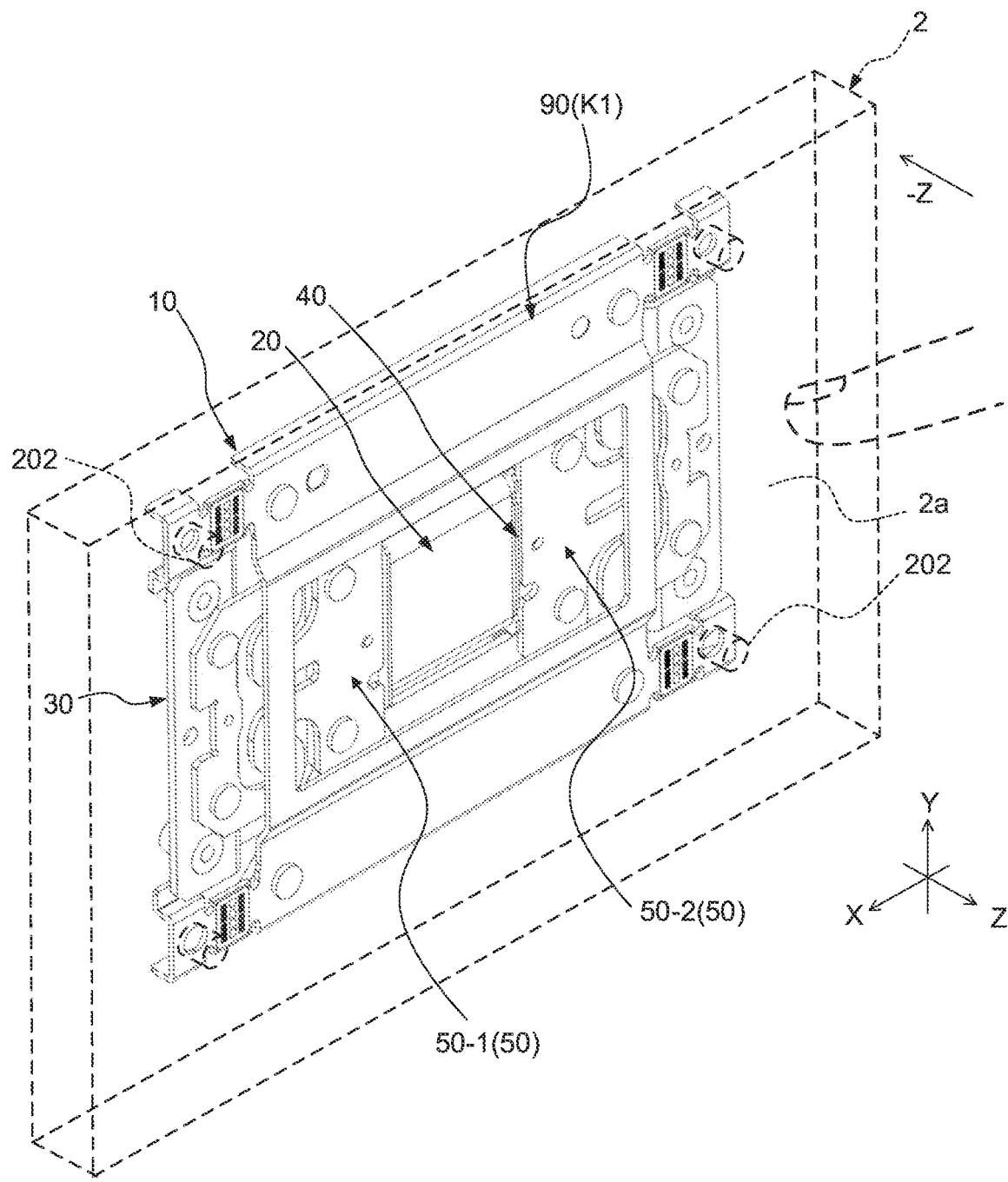
FIG. 1 is a perspective view of a vibration presenting apparatus including a vibration actuator according to Embodiment 1 of the present invention.

Vibration presenting apparatus 1 illustrated in FIG. 1 includes vibration actuator 10, and an operation device (touch screen 2 in the present embodiment) as a vibration presenting part on which the operator performs a contact operation. Vibration presenting apparatus 1 is a tactile sense presenting apparatus that gives a contact operation feeling (also referred to as "tactile feeling" or "force sense") to the operator, who comes into contact with the operation device to perform an operation thereof in accordance with an application and a use situation of the operation device, via the operation device.

In the present embodiment, the operation device is touch screen 2 that displays a screen and is operated by a contact with the screen. Touch screen 2 is a touch screen of an electrostatic capacity type, a resistive film type, an optical type or the like. Note that, touch screen 2 detects a contact position of the operator and is controlled by a control part (including microcomputer 220 illustrated in FIG. 17 or the like, for example). In the present embodiment, touch screen 2 is a touch screen of an electrostatic capacity type. The control part is capable of obtaining information on a touch position of a user via a touch screen control part (not illustrated). Further, screen 2a of touch screen 2 is formed of a display part of a liquid crystal system, an organic EL system, an electronic paper system, a plasma system, or the like. Touch screen 2 may also be controlled by the touch screen control part. The touch screen control part controls display information (not illustrated) and presents an image in accordance with the type of presented vibration on the screen to the operator.

Vibration presenting apparatus 1 is used, for example, as a touch screen apparatus of a car navigation system as an electronic device. Vibration presenting apparatus 1 functions as an apparatus that presents vibration to the operator who comes into contact with screen 2a of touch screen 2 to perform an operation thereof. At this time, vibration presenting apparatus 1 may be any electronic device that gives a tactile feeling to the operator by presenting vibration to the operator who comes into contact with a vibration object. For example, vibration presenting apparatus 1 may be an image display apparatus such as a smartphone, a tablet computer, and a TV; a game machine with a touch screen; a game controller with a touch screen, or the like.

Specifically, in vibration presenting apparatus 1, when a pressing object such as a finger pulp or the like of the operator comes into contact with screen 2a of touch screen 2 to perform an operation, vibration actuator 10 is driven to vibrate in accordance with the operation. This vibration gives a tactile feeling to the operator.

Vibration actuator 10 of the present embodiment gives various types of tactile feelings in accordance with a display image operated by the operator. For example, vibration actuator 10 gives a tactile feeling as a mechanical switch such as a tactile switch, an alternate type switch, a momentary switch, a toggle switch, a sliding switch, a rotary switch, a DIP switch, and a rocker switch in accordance with an image to be brought into contact with and operated. Further, in a push type switch, vibration actuator 10 is also capable of giving tactile feelings of the switch with different push-in degrees.

Note that, in vibration presenting apparatus 1, an operation device, which does not have a display function and with which the operator can simply come into contact to perform an operation, may be used instead of touch screen 2 as the operation device.

In vibration presenting apparatus 1, vibration actuator 10 is disposed between touch screen 2 and a base (not illustrated) disposed on the rear surface side of touch screen 2. Vibration actuator 10 is fixed to the base (not illustrated) by fixing body 30.

<Vibration Presenting Part (Touch Screen 2)>

Touch screen 2, on the rear surface side thereof, is fixed to strain generating member 90 of load detecting part K1 provided in movable body 40 (see FIG. 2) of actuator main body A1 in vibration actuator 10. Thus, vibration actuator 10 is disposed between touch screen 2 and the base (not illustrated) so as to connect each other.

Touch screen 2 itself can be driven integrally with movable body 40. A direction in which a finger or the like of the operator comes into contact with and presses screen 2a of touch screen 2, for example, a direction perpendicular to the screen of touch screen 2 (also referred to as "surface perpendicular direction") is included in the same direction as the Z direction that is the vibration direction of movable body 40 in vibration actuator 10. In vibration actuator 10, the direction in which the finger or the like of the operator presses screen 2a of touch screen 2 is the minus Z direction.

Thus, according to vibration presenting apparatus 1 in which the control part, touch screen 2, and vibration actuator 10 are mounted, touch screen 2 can be directly operated, that is, touch screen 2 is driven together with movable body 40 in the same direction as a contact direction of a finger so that touch screen 2 can be directly vibrated.

Accordingly, when an operation is performed by coming into contact with an image displayed on touch screen 2, movable body 40 can be moved to give vibration serving as an operation feeling in accordance with the image to touch screen 2. Note that, the image may be an image of an object or the like, which gives a tactile feeling to a finger or the like when the finger or the like comes into contact with the image, an image of an object that moves while giving a tactile feeling by a contact operation, or the like. Thus, touch screen 2 can present vibration to the operator and express a comfortable operation.

Touch screen 2 of the present embodiment includes a contact position detecting part capable of detecting, even in a non-contact manner, a position of a finger (pressing object) of the operator who performs a pressing operation on screen 2a of touch screen 2. The contact position detecting part is a proximity sensor that electrically detects the presence of a pressing object in proximity. In the present embodiment, the contact position detecting part detects a position of a finger of the operator by detecting capacitive coupling between the contact position detecting part and the finger.

An electrostatic capacity sensor used in an ordinary touch screen of an electrostatic capacity type has a level of sensitivity that responds at a position of a finger that abuts on the screen. The contact position detecting part of the present embodiment, on the other hand, is capable of detecting a finger even in a state in which the finger does not come into contact with screen 2a and is separated from screen 2a by a predetermined distance. This predetermined distance is set by setting the sensitivity of the contact position detecting part, which detects capacitive coupling, to be higher than the sensitivity of an electrostatic capacity sensor used for detecting a pressing object coming into contact with a screen in an ordinary touch screen. Thus, the contact position detecting part has detection sensitivity that allows detection of a contact position of a pressing object such as a finger or the like even in the case of contact via a material incapable of capacitive coupling. Thus, movable body 40 of vibration actuator 10 is driven by the control part to be described later based on a position of a finger detected by the contact position detecting part.

<Entire Configuration of Vibration Actuator 10>

Figure 2:
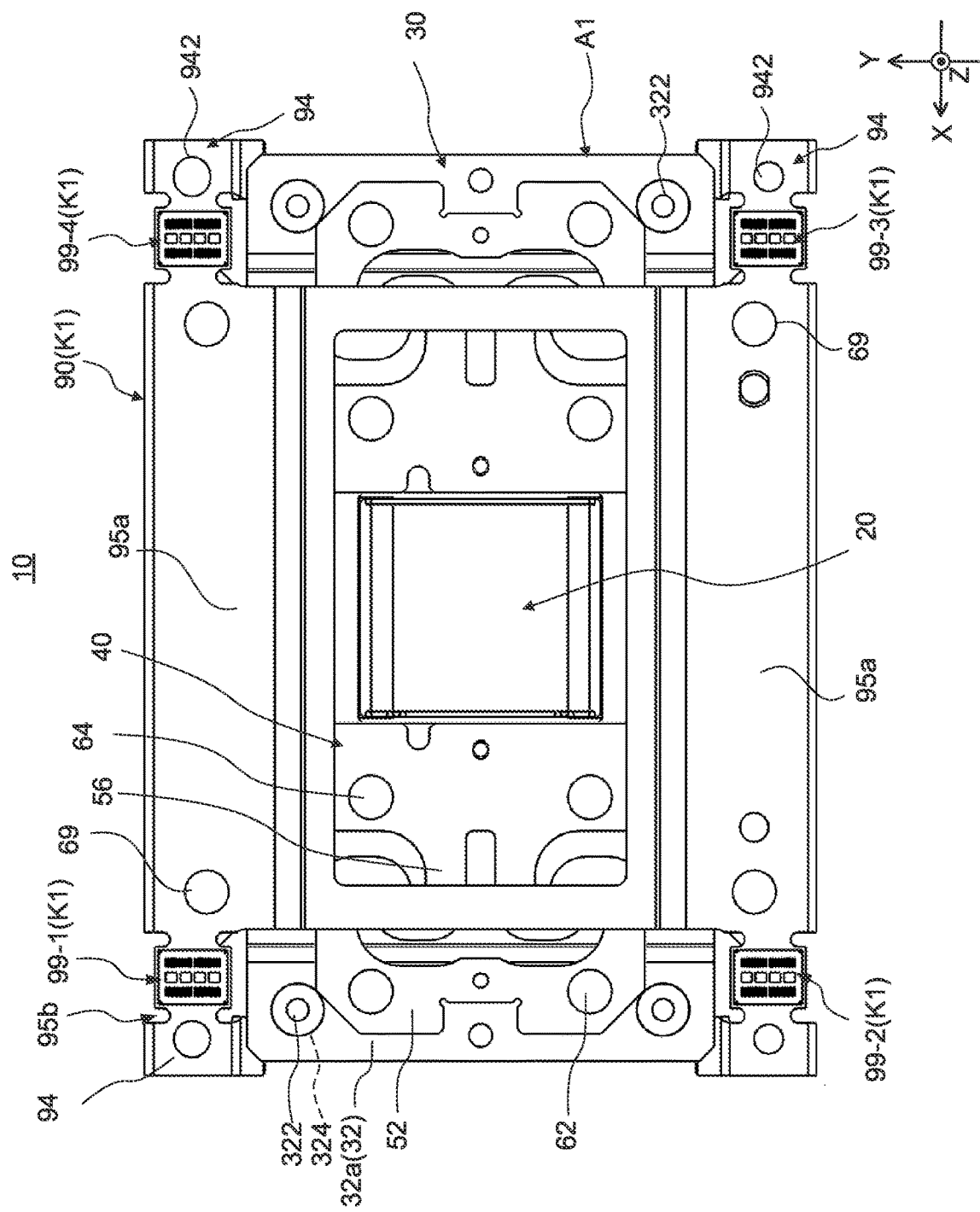
FIG. 2 is a front view of the vibration actuator.
Figure 3:
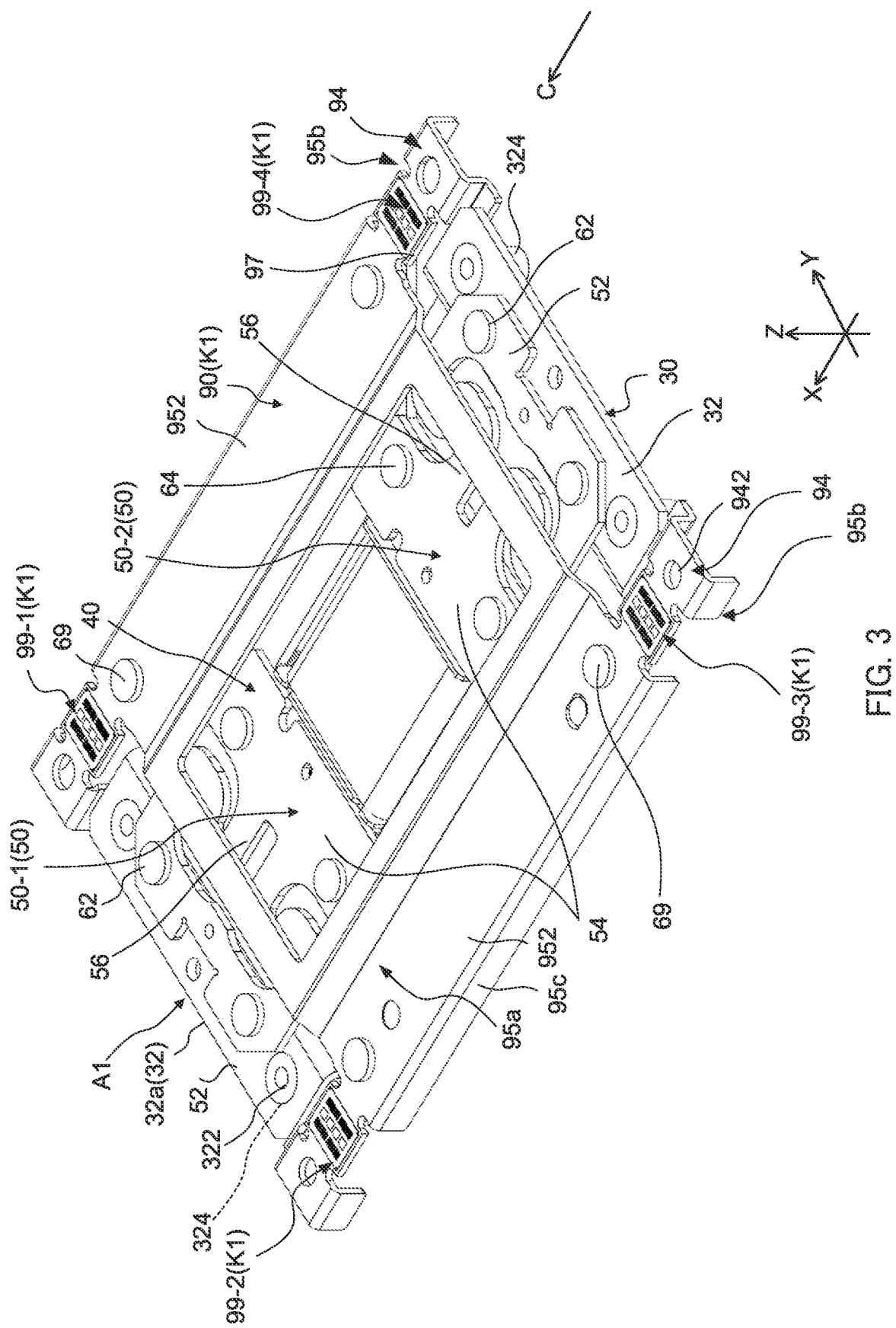
FIG. 3 is a front surface-side perspective view of the vibration actuator.
Figure 4:
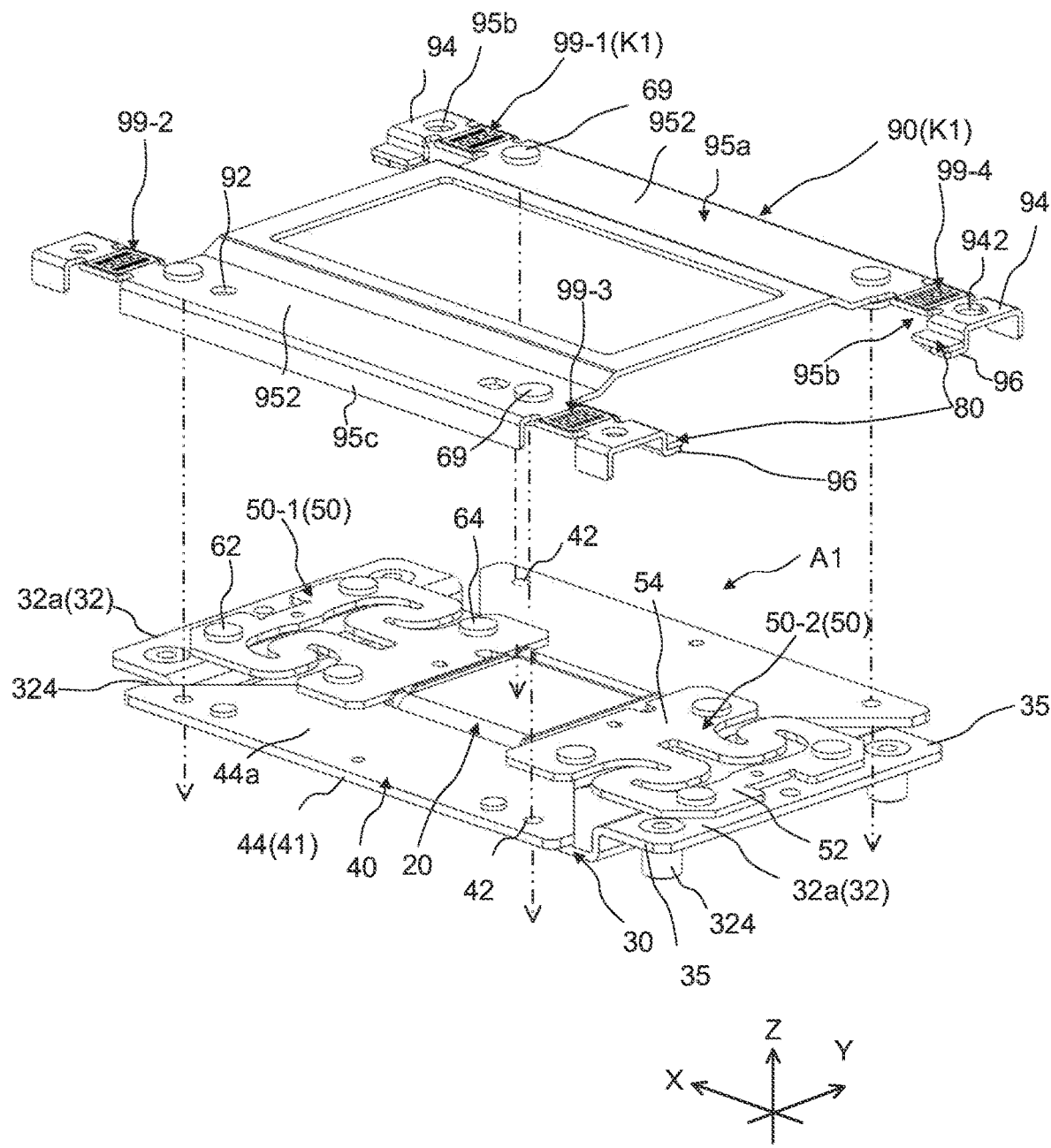
FIG. 4 is a perspective view of an actuator main body and a load detecting part in the vibration actuator.
Figure 5:
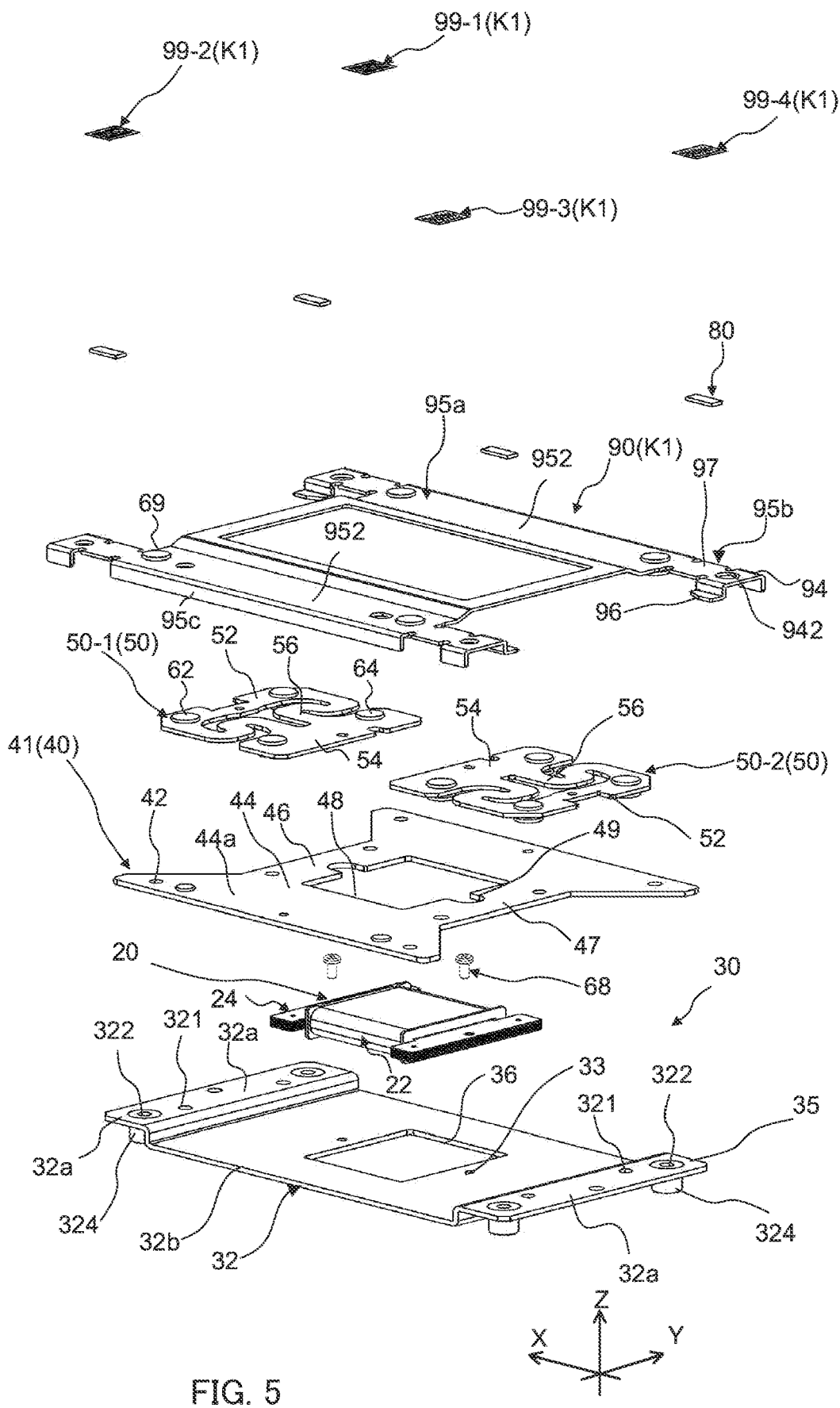
FIG. 5 is an exploded perspective view of the vibration actuator.
Figure 6:
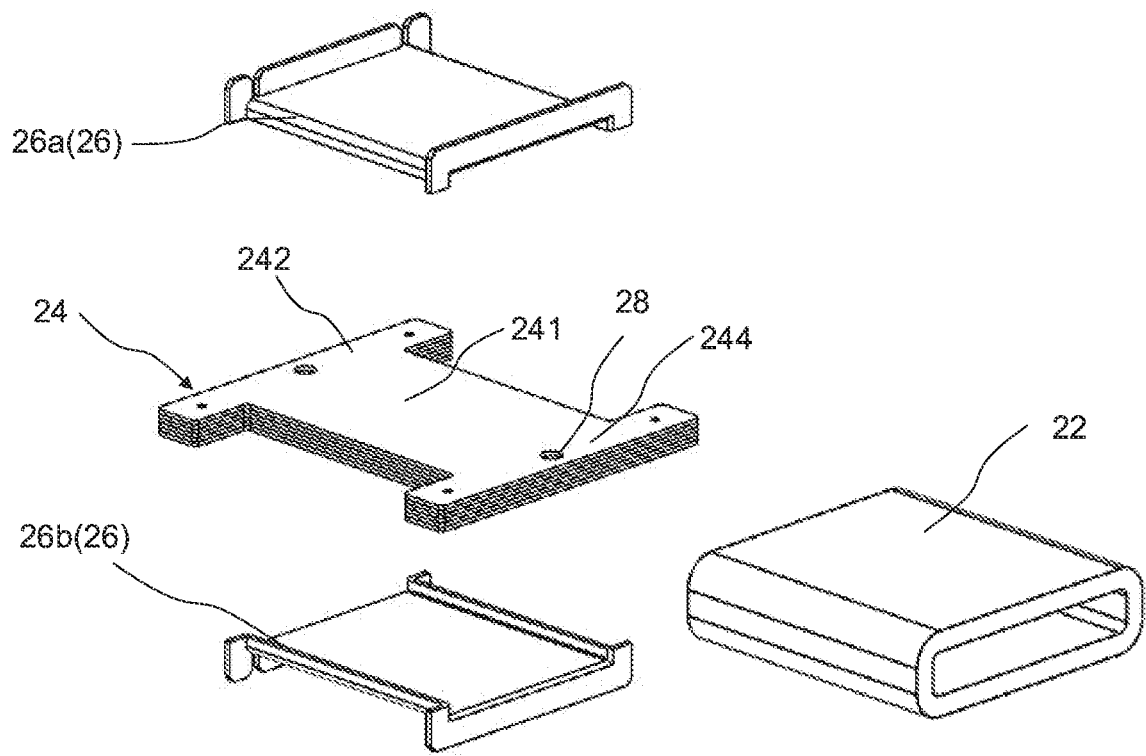
FIG. 6 is an exploded view of a coil assembly of the vibration actuator illustrated in FIG. 5.

FIG. 2 is a front view of the vibration actuator. FIG. 3 is a front surface-side perspective view of the vibration actuator. FIG. 4 is a perspective view of an actuator main body and a load detecting part in the vibration actuator. FIG. 5 is an exploded perspective view of the vibration actuator. FIG. 6 is an exploded view of a coil assembly of the vibration actuator illustrated in FIG. 5.

Vibration actuator 10 is a flat plate- or a thin plate-shaped vibration actuator, and is disposed so as to face the rear surface side of touch screen 2 in a thickness direction where the Z direction is the thickness direction.

Vibration actuator 10 includes actuator main body A1 and load detecting part K1. Load detecting part K1 is provided in movable body 40 of actuator main body A1 and functions as a movable part together with movable body 40.

In vibration actuator 10, strain detecting part 99 detects strain of strain generating member 90 when a pressing operation is performed on touch screen 2, and vibration actuator 10 vibrates in accordance with the detection result of strain detecting part 99 to give vibration to touch screen 2. First, actuator main body A1 will be described.

<Actuator Main Body A1>

Figure 7:
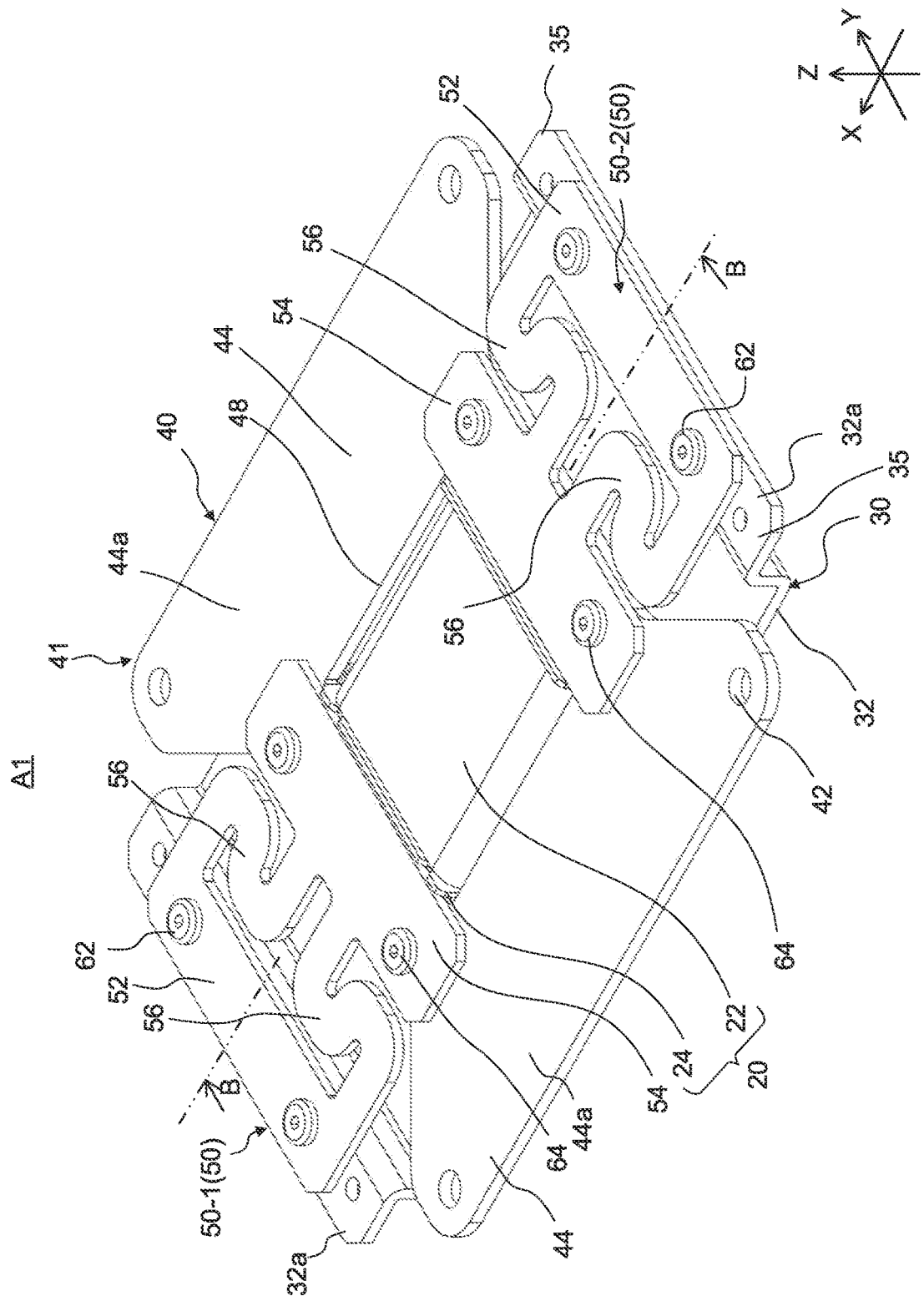
FIG. 7 is a front surface-side perspective view of the actuator main body of the vibration actuator.
Figure 8:
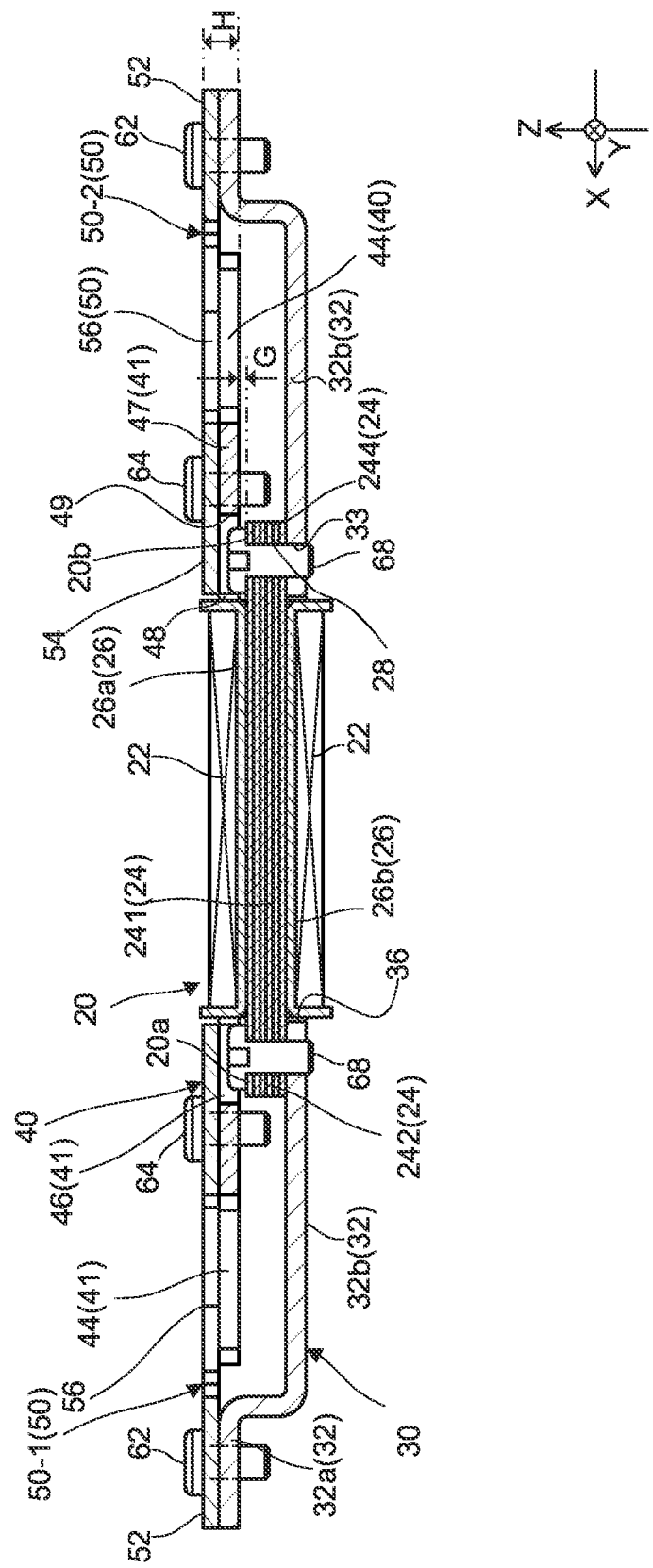
FIG. 8 is a cross-sectional view taken along line B-B and seen in a direction of arrows B of FIG. 7.

FIG. 7 is a front surface-side perspective view of the actuator main body of the vibration actuator. FIG. 8 is a cross-sectional view taken along line B-B and seen in a direction of arrows B of FIG. 7.

In the present embodiment, actuator main body A1 illustrated in FIGS. 2 to 8 is mounted together with the control part in vibration presenting apparatus (electronic device) 1 and functions as a vibration generating part of touch screen 2 (see FIG. 1) as an example of the operation device.

Actuator main body A1 functions as an electromagnetically driven electromagnetic actuator that causes linear reciprocating movement (vibration) of movable body 40 by driving movable body 40 in one direction and by moving movable body 40 in a direction opposite to the one direction by an urging force of members (plate-shaped elastic parts 50-1 and 50-2) that generates the urging force.

Vibrating touch screen 2 in accordance with a contact operation by the operator on screen 2a of touch screen 2 and transmitting the vibration of touch screen 2 to the operator such that the operator feels the vibration as a body feeling enable the operator who comes into contact with touch screen 2 to perform an intuitive operation. For example, in touch screen 2, the contact position detecting part receives a contact operation by the operator on touch screen 2 and outputs the contact position thereof. In this case, the control part causes, based on contact position information outputted by the contact position detecting part and a driving timing, a driving current to be supplied to actuator main body A1 by output of an actuator driving signal such that vibration corresponding to the contact operation is generated.

Actuator main body A1 that receives the driving current supplied by the control part generates vibration corresponding to the contact position outputted from touch screen 2 and transmits the vibration to touch screen 2, thereby vibrating touch screen 2 directly. Thus, actuator main body A1 receives an operation of the operator received by touch screen 2 and is driven in accordance therewith.

The actuator driving signal is inputted to actuator main body A1 via the control part so that actuator main body A1 moves movable body 40 in one direction, for example, to the minus side in the Z direction against the urging force. Further, the input of the actuator driving signal to actuator main body A1 is stopped so that actuator main body A1 releases the urging force and moves movable body 40 to a side of the other direction (the plus side in the Z direction) by the urging force. Actuator main body A1 vibrates movable body 40 and the operation device by inputting and stopping the actuator driving signal. Actuator main body A1 vibrates the operation device by driving movable body 40 without using a magnet.

Actuator main body A1 includes fixing body 30 including base part 32 and core assembly 20 in which coil 22 is wound around core 24; movable body 40 including yoke 41 of a magnetic material; and plate-shaped elastic part 50 (50-1 and 50-2) as the elastic support part. Details of plate-shaped elastic part 50 (50-1 and 50-2) that elastically supports movable body 40 such that movable body 40 is movable in the vibration direction with respect to fixing body 30 will be described later. Note that, although the elastic support part is configured to have a plate shape, the elastic support part may not have a plate shape as long as the elastic support part elastically supports movable body 40 such that movable body 40 is movable in the vibration direction with respect to fixing body 30. Further, the number of plate-shaped elastic part 50 (50-1 and 50-2) forming the elastic support part is not limited either. In the following description, "plate-shaped elastic parts 50-1 and 50-2" may also be collectively and simply referred to as "plate-shaped elastic part 50".

Actuator main body A1 drives movable body 40 by energizing coil 22 such that movable body 40 moves in one direction (for example, to the minus side in the Z direction that is a direction approaching base part 32) with respect to fixing body 30. Further, the movement of movable body 40 in the direction opposite to the one direction (for example, the movement to the plus side in the Z direction) is performed by the urging force of plate-shaped elastic part 50.

Actuator main body A1 vibrates yoke 41 of movable body 40 by energizing core assembly 20. Specifically, movable body 40 is vibrated by an attraction force of core 24 excited by coil 22 to be energized, which electromagnetically attracts yoke 41, and by the urging force of plate-shaped elastic part 50, which attempts to return yoke 41 displaced in the Z direction to the neutral position in the Z direction.

Actuator main body A1 is formed in a flat shape with the Z direction as the thickness direction. Actuator main body A1 vibrates movable body 40 with respect to fixing body 30 with the Z direction, that is, the thickness direction as the vibration direction.

In the present embodiment, actuator main body A1 moves movable body 40 in one direction, that is, to the minus side in the Z direction by the attraction force of core 24, and moves movable body 40 in the opposite direction, that is, to the plus side in the Z direction by the urging force of plate-shaped elastic part 50. Note that, in actuator main body A1, a plurality of plate-shaped elastic parts 50 is disposed along the direction orthogonal to the Z direction and elastically supports movable body 40 at positions of point symmetry with respect to the moving center of movable body 40, but the configuration is not limited thereto.

Further, in the present embodiment, actuator main body A1 detects displacement of touch screen 2, on which a pressing operation is performed, as strain of strain generating member 90 by strain sensors 99-1 to 99-4 as strain detecting part 99, and vibrates by moving movable body 40 in accordance with the detected strain.

<Fixing Body 30>

As illustrated in FIGS. 5 and 6, fixing body 30 includes: core assembly 20 including coil 22, core 24, and bobbin 26; base part 32; and engaged part 35.

<Base Part 32>

Core assembly 20 is fixed to base part 32. Base part 32 is connected to movable body 40 via plate-shaped elastic part 50, and movably supports movable body 40 in the vibration direction. Base part 32 is a flat-shape member, and forms the bottom surface of actuator main body A1, in other words, the bottom surface of vibration actuator 10.

Base part 32 includes attachment parts 32a to which one end parts of plate-shaped elastic part 50 are fixed, respectively, such that attachment parts 32a hold core assembly 20 therebetween in the width direction (the X direction). Each of attachment parts 32a is disposed with the same distance from core assembly 20 in the width direction (the X direction) and at a higher position (that is, on the front surface side) than bottom surface part 32b of base part 32 in the Z direction. Note that, the distance between each of attachment parts 32a and core assembly 20 serves as a deformation region of plate-shaped elastic part 50.

As illustrated in FIG. 5, attachment part 32a includes fixing holes 321 for fixing plate-shaped elastic part 50; and fixing holes 322 for fixing base part 32 on a side of the base (not illustrated).

Fixing holes 322 are provided in both end parts of attachment part 32a so as to hold fixing holes 321 therebetween in the height direction (the Y direction), and communicate with through-holes (not illustrated) of fixing leg parts 324 having a cylindrical shape and projected from the rear surface side of attachment part 32a. Thus, base part 32 is entirely and stably fixed to the base (not illustrated) by fastening members that fit into fixing holes 322 via fixing leg parts 324.

In the present embodiment, base part 32 is formed of a processed sheet metal such that one side part and the other side part thereof as attachment parts 32a hold bottom surface part 32b therebetween and are located separated from each other in the width direction (the X direction).

A recessed part including bottom surface part 32b located on the back surface side rather than attachment parts 32a is provided between attachment parts 32a. The space inside the recessed part, that is, on the front surface side of bottom surface part 32b is a space for ensuring an elastic deformation stroke of plate-shaped elastic part 50 and further a movable stroke of movable body 40 supported by plate-shaped elastic part 50.

Bottom surface part 32b has a rectangular shape, opening part 36 is formed in the center thereof, and core assembly 20 is disposed inside opening part 36.

Opening part 36 has a shape in accordance with the shape of core assembly 20. In the present embodiment, opening part 36 is formed in a square shape. Thus, actuator main body A1 in its entirety can be configured to have a substantially square shape in a front view by disposing core assembly 20 and movable body 40 in a central portion of actuator main body A1. Note that, opening part 36 may have a rectangular shape (including a square shape).

A lower-side part of core assembly 20 (divided body 26b of bobbin 26 and a lower-side part of coil 22) is inserted into opening part 36, and is fixed such that core 24 is located on bottom surface part 32b in a side view. Thus, the length (depth, thickness) of actuator main body A1 in the Z direction is shorter by a part of core assembly 20 being disposed within opening part 36 in comparison with a configuration in which core assembly 20 in its entirety is disposed on bottom surface part 32b. Further, core assembly 20 is fixed by screws (not illustrated) as an example of the fastening members in a state in which a part, here, a lower-side part of core assembly 20 is fitted into opening part 36. Thus, core assembly 20 is firmly fixed to bottom surface part 32b in a state in which core assembly 20 is not easily detached from bottom surface part 32b.

<Core Assembly 20>

As illustrated in FIG. 6, core assembly 20 is formed by winding coil 22 around the outer periphery of core 24 via bobbin 26.

When coil 22 is energized, core assembly 20 vibrates yoke 41 of movable body 40 (linearly and reciprocatingly moves yoke 41 of movable body 40 in the Z direction) in cooperation with plate-shaped elastic part 50.

In the present embodiment, core assembly 20 is formed in a rectangular plate shape. Magnetic pole parts 242 and 244 are disposed in both side parts of the rectangular plate shape, which are separated from each other in the longitudinal direction (corresponding to the X direction in the present embodiment).

Magnetic pole parts 242 and 244 are disposed to face attracted surface parts 46 and 47 of movable body 40 with gap G therebetween in the Z direction (see FIG. 8). In the present embodiment, opposite surfaces (opposite surface parts) 20a and 20b as the upper surfaces of magnetic pole parts 242 and 244 are in proximity to the rear surfaces of attracted surface parts 46 and 47 of yoke 41 in the vibration direction (the Z direction) of movable body 40. Specifically, the front surfaces of magnetic pole parts 242 and 244 are disposed to be separated from and to face the rear surfaces of attracted surface parts 46 and 47 at portions other than notch 49.

As illustrated in FIGS. 7 and 8, core assembly 20 is fixed to base part 32 in a state in which core assembly 20 is disposed with a winding axis of coil 22 toward the opposite direction (the X direction orthogonal to the vibration direction) of attachment parts 32a separated from each other in base part 32. In the present embodiment, core assembly 20 is disposed in a central part of base part 32, specifically in a central part of bottom surface part 32b.

As illustrated in FIG. 8, core assembly 20 is fixed to bottom surface part 32b such that core 24 is located across opening part 36 above bottom surface part 32b while being parallel to bottom surface part 32b. Core assembly 20 is fixed in a state in which coil 22 and a portion (core main body 241) to be wound around coil 22 are located within opening part 36 of base part 32.

Specifically, core assembly 20 is fixed to bottom surface part 32b by fastening screws 68 as the fastening members through fixing holes 28 and fastening holes 33 (see FIG. 8) of bottom surface part 32b in a state in which coil 22 is disposed within opening part 36. Screws 68 are fastened at two positions on an axial center of coil 22.

Coil 22 functions as a solenoid that is energized and generates a magnetic field when actuator main body A1 is driven. Coil 22, core 24, and movable body 40 form a magnetic circuit (magnetic path) that attracts and moves movable body 40. A driving current is supplied to coil 22 from an external power supply via the control part. Actuator main body A1 is driven when the driving current is supplied to coil 22.

As illustrated in FIG. 6, core 24 includes core main body 241 around which coil 22 is wound, and magnetic pole parts 242 and 244 provided in both end parts of core main body 241 and excited by energizing coil 22. Core 24 may have any structure as long as the structure has such a length that the both end parts of core 24 serve as magnetic pole parts 242 and 244 by energizing coil 22. For example, core 24 of the present embodiment is formed in an H-type flat plate shape in a plan view although core 24 may be formed in a straight-type (I-type) flat plate shape.

In the case of the I-type core, in the both end parts (magnetic pole parts) of the I-type core, the areas of surfaces (air gap side surfaces) on sides of attracted surface parts 46 and 47 facing each other with air gap G therebetween become narrower. Thus, the magnetic resistance in the magnetic circuit may increase and the conversion efficiency may decrease. Further, in a case where bobbin 26 is attached to core 24, a protruding part, which is positioned such that the bobbin in the longitudinal direction of core 24 does not come off from the longitudinal direction, disappears or becomes smaller so that it is necessary to provide the protruding part separately. In contrast, since core 24 is of the H-type, the air gap side surfaces in the both end parts of core main body 241 can be longer than core main body 241, around which coil 22 is wound, and can be enlarged in the height direction (the Y direction), and a decrease in the magnetic resistance and improvement in the efficiency of the magnetic circuit can be achieved. Further, coil 22 can be positioned by simply fitting bobbin 26 between portions of magnetic pole parts 242 and 244, where the portions project from core main body 241, and it is unnecessary to separately provide a positioning member for bobbin 26 with respect to core 24.

In core 24, in the respective both end parts of core main body 241 having a plate shape, around which coil 22 is wound, magnetic pole parts 242 and 244 are provided to protrude in the direction (corresponding to the height direction (the Y direction) in the present embodiment) orthogonal to the winding axis of coil 22 (in short, the H-type core).

Core 24 is a magnetic material made of a soft magnetic material or the like, and is formed from, for example, a silicon steel sheet, permalloy, ferrite or the like. Further, core 24 may also be formed of electromagnetic stainless steel, a sintered material, an MIM (metal injection mold) material, a laminated steel sheet, an electrogalvanized steel sheet (SECC), or the like.

Magnetic pole parts (attraction part) 242 and 244 are magnetized by energizing coil 22, attract and move yoke 41 of movable body 40, which is separated from magnetic pole parts 242 and 244 in the vibration direction (the Z direction). Specifically, magnetic pole parts 242 and 244 attract attracted surface parts 46 and 47 of movable body 40, which are disposed to face magnetic pole parts 242 and 244 via gap G, by a generated magnetic flux, and move attracted surface parts 46 and 47 to the minus side in the Z direction.

In the present embodiment, magnetic pole parts 242 and 244 are plate-shaped bodies extending in the Y direction that is a direction perpendicular to core main body 241 extending in the X direction. Magnetic pole parts 242 and 244 are long in the Y direction so that the areas of opposite surfaces 20a and 20b facing yoke 41 are wider than those of the configurations of magnetic pole parts 242 and 244 formed in the both end parts of core main body 241.

Bobbin 26 is disposed surrounding core main body 241 of core 24 while extending so as to be orthogonal to the vibration direction (the Z direction) along the XY plane on which core main body 241 extends. Bobbin 26 is formed from a resin material, for example, which makes it possible to ensure electrical insulation with other metallic members (for example, core 24) so that the reliability of coil 22, which is wound around bobbin 26, improves as the electric circuit. Formability improves by using a resin of high fluidity as the resin material so that the thickness of bobbin 26 can be reduced while ensuring the strength of bobbin 26. Note that, bobbin 26 is formed as a cylindrical body covering the periphery of core main body 241 by assembling divided bodies 26a and 26b such that divided bodies 26a and 26b hold core main body 241 therebetween. In bobbin 26, flanges are provided in the both end parts of the cylindrical body. The flanges define the position where coil 22 surrounding the outer periphery of core main body 241 is disposed.

<Movable Body 40>

Movable body 40 is disposed so as to face core assembly 20 with gap G therebetween in the direction orthogonal to the vibration direction (the Z direction). Movable body 40 is provided to be reciprocatingly movable in the vibration direction with respect to core assembly 20.

Movable body 40 includes yoke 41, and includes movable-body side fixing part 54 of plate-shaped elastic part 50 fixed to yoke 41.

Movable body 40 is disposed in a state (reference normal position) of being movable in an approaching/separating direction (the Z direction) with respect to bottom surface part 32b via plate-shaped elastic part 50 and being hanged separated substantially in parallel.

Yoke 41 is a magnetic path of a magnetic flux to be generated when coil 22 is energized, and is a plate-shaped body formed of a magnetic material such as electromagnetic stainless steel, a sintered material, an MIM (metal injection mold) material, a laminated steel sheet, an electrogalvanized steel sheet (SECC), or the like. In the present embodiment, yoke 41 is formed by processing an SECC sheet.

Yoke 41 is suspended so as to face core assembly 20 with gap G (see FIG. 8) therebetween in the vibration direction (the Z direction) by plate-shaped elastic part 50 to be fixed to each of attracted surface parts 46 and 47 separated from each other in the X direction.

In order to attach yoke 41 to the operation device (see touch screen 2 illustrated in FIG. 1), yoke 41 includes surface-part fixing part 44 to be fixed to strain generating member 90, and attracted surface parts 46 and 47 to be disposed to face magnetic pole parts 242 and 244. Yoke 41 is formed in a rectangular frame shape including opening part 48 in a central part thereof with surface-part fixing part 44 and attracted surface parts 46 and 47. Further, attracted surface parts 46 and 47 function as a support-part side fixing part to which movable-body side fixing parts 54 of plate-shaped elastic part 50 is fixed and which is supported by fixing body 30 via plate-shaped elastic part 50.

Opening part 48 faces coil 22. In the present embodiment, opening part 48 is located right above coil 22, and the opening shape of opening part 48 allows the part of coil 22 in core assembly 20 to be inserted thereto when yoke 41 moves to a side of bottom surface part 32b.

Yoke 41 is configured to include opening part 48 so that the thickness of actuator main body A1 and further of vibration actuator 10 in its entirety can be reduced in comparison with a case where there is no opening part 48.

Further, core assembly 20 is located within opening part 48 so that yoke 41 is not disposed near coil 22, a decrease in the conversion efficiency due to magnetic flux leakage leaked from coil 22 can be suppressed, and a high output can be achieved.

Surface-part fixing part 44 includes fixing surface 44a to be fixed to main body frame part 95a of strain generating member 90. Surface-part fixing part 44 has a plate shape.

In the present embodiment, surface-part fixing part 44 is disposed so as to face touch screen 2 at a portion surrounding the center of the operation surface of touch screen 2. Surface-part fixing part 44 is fixed to touch screen 2 via strain generating member 90.

Specifically, an edge part of fixing surface 44a of surface-part fixing part 44 is disposed along a long side part of main body frame part 95a and is fixed to the long side part in a surface contact therewith. In the present embodiment, fixing surface 44a has a trapezoidal shape in a plan view, and is fixed to strain generating member 90 via fastening members such as screws 69 (see FIGS. 4 and 5) to be inserted into surface-part fixing holes 42.

In surface-part fixing part 44, a center of movable body 40 in a front view, where the center extends in the vibration direction (the Z direction) of movable body 40, is preferably disposed so as to be located on the same line as the center of the operation surface of touch screen 2. Thus, the entire front-side surface of movable body 40 can receive displacement of touch screen 2 via strain generating member 90.

In the present embodiment, surface-part fixing holes 42 are provided, in a front view, on outer sides of movable body 40 with core assembly 20 as the center and at diagonally located portions or near the diagonally located portions.

Attracted surface parts 46 and 47 are fixed to plate-shaped elastic part 50 in a state of being disposed at positions facing magnetic pole parts 242 and 244 such that attracted surface parts 46 and 47 are attracted to magnetic pole parts 242 and 244 when magnetic pole parts 242 and 244 of core assembly 20 are magnetized.

Movable-body side fixing parts 54 of plate-shaped elastic parts 50-1 and 50-2 are fixed in a stacked state to attracted surface parts 46 and 47, respectively. Attracted surface parts 46 and 47 are provided with notches 49 that escape from head parts of screws 68 of core assembly 20 when attracted surface parts 46 and 47 move to a side of bottom surface part 32b.

Thus, even when movable body 40 moves to the side of bottom surface part 32b and attracted surface parts 46 and 47 approach magnetic pole parts 242 and 244, attracted surface parts 46 and 47 do not come into contact with screws 68 that fix magnetic pole parts 242 and 244 to bottom surface part 32b, and a movable region (movable stroke) of yoke 41 for that in the Z direction can be ensured.

<Load Detecting Part K1>

Load detecting part K1 illustrated in FIGS. 1 to 5 is provided integrally with movable body 40 of actuator main body A1, is interposed between a main body of movable body 40 and touch screen 2, and is fixed to movable body 40 and touch screen 2.

Load detecting part K1 includes strain generating member 90, and strain detecting part 99 provided in strain generating member 90, and detects strain generated in strain generating member 90 by strain detecting part 99 in accordance with a pressing operation on touch screen 2. The detected strain is outputted to the control part, and the control part causes actuator main body A1 to be driven in accordance with the strain to generate vibration.

<Strain Generating Member 90>

Strain generating member 90 functions as a strain generating body that generates strain by application of an external force by a pressing operation on touch screen 2.

Strain generating member 90 includes movable-body side fixing part (support-part side fixing part) 92 (see FIG. 10) to be fixed to surface-part fixing part 44 of movable body 40, and presentation part-side fixing part 94 to be fixed to touch screen 2. Strain generating member 90 further includes strain part 97 provided between movable-body side fixing part 92 and presentation part-side fixing part 94. Strain detecting part 99 is attached to strain part 97 and detects strain of strain part 97.

In the present embodiment, strain generating member 90 is formed in a rectangular frame-like plate shape by processing a sheet metal. This shape causes a portion subjected to a pressing operation in touch screen 2 (for example, a central part of the operation surface in touch screen 2) to be disposed such that the portion is surrounded on the rear surface side of touch screen 2 when strain generating member 90 is fixed to touch screen 2. In the present embodiment, strain generating member 90 is formed of a sheet metal harder than plate-shaped elastic part 50. Note that, in the present embodiment, strain generating member 90 is a plate-shaped spring plate material. Thus, even when vibration is repeatedly given, metal fatigue can be mitigated and the reliability can be improved.

In strain generating member 90, connecting-arm parts 95b are provided to protrude along the extending direction of a pair of long side parts 952, which face each other, from four corners of main body frame part 95a having a flat rectangular frame shape and including long side parts 952.

Strain generating member 90 includes movable-body side fixing parts 92 that are fixed to yoke 41 via screws 69 as the fastening members provided in each portion of main body frame part 95a to which base end parts of connecting-arm parts 95b are connected. Strain generating member 90 is fixed to surface-part fixing part 44 via movable-body side fixing parts 92.

Connecting-arm part 95b is provided with strain part 97 and presentation part-side fixing part 94 in this order from the base end part in the protruding direction.

Connecting-arm part 95b includes strain part 97 between long side part 952 of main body frame part 95a and presentation part-side fixing part 94. In strain part 97, strain detecting part 99 is provided in a state of being stuck.

In strain generating member 90 of the present embodiment, main body frame part 95a is fixed to surface-part fixing part 44 of movable body 40 and presentation part-side fixing part 94 is fixed to touch screen 2 so that the function as the strain generating body is exhibited by strain parts 97. When presentation part-side fixing part 94 is displaced, strain generating member 90 (in particular strain parts 97) and surface-part fixing part 44 are pushed in to a side of bottom surface part 32b, and are strained in accordance with deformation of plate-shaped elastic part 50.

Strain generating member 90 includes ribs 95c provided along outer edge parts of long side parts 952 of main body frame part 95a and perpendicular to main body frame part 95a. Main body frame part 95a is in a state of being reinforced by ribs 95c.

In strain generating member 90, presentation part-side fixing parts 94 are joined and fixed to touch screen 2 via fastening members 202 inserted through fixing holes 942. Thus, presentation part-side fixing parts 94 are joined to touch screen 2 at portions surrounding the center of the operation surface of touch screen 2. Further, the positions of movable-body side fixing parts 92 to be fixed to movable body 40 are in an inner region surrounded by presentation part-side fixing parts 94.

<Strain Detecting Part 99>

Strain detecting part 99 is provided in strain parts 97 of strain generating member 90, and detects strain generated by a load applied to strain generating member 90 as the strain generating body for driving actuator main body A1. Strain detecting part 99 includes, for example, a plurality of strain sensors 99-1 to 99-4. Each of strain sensors 99-1 to 99-4 is provided in strain part 97 and is therefore in a state of being disposed between movable-body side fixing part 92 and presentation part-side fixing part 94.

As described above, in the present embodiment, strain generating member 90 in which strain detecting part 99 is provided is formed of an integral spring plate material. Thus, it is possible to increase the positional accuracy of positions in connecting-arm parts 95b of strain generating member 90, where strain sensors 99-1 to 99-4 are disposed at the positions, and it is possible to achieve an improvement in the accuracy at the time of assembly. That is, unlike a case where connecting-arm parts 95b as the strain generating body serving as detection target portions in strain generating member 90 are configured by division thereof into a plurality of parts, no variation occurs at the time of assembly, and an improvement in the assemblability can be achieved.

Further, in the present embodiment, strain detecting part 99 is provided on each strain part 97 as the strain generating body whose strain is detected by strain detecting part 99. That is, strain detecting part 99 and each strain part 97 are disposed between touch screen 2 as the vibration presenting part and movable body 40, that is, between movable-body side fixing part 92 and presentation part-side fixing part 94.

Thus, strain detecting part 99 is not disposed within actuator main body A1 and the strain generating body is separated from plate-shaped elastic part 50 so that the strain detection object does not receive the mass of movable body 40 and the vibration specification of plate-shaped elastic part 50 is not affected either. Thus, the design of actuator main body A1 does not become difficult, and various specifications of actuator main body A1 can be realized.

Actuator main body A1 is fixed to touch screen 2 as the vibration presenting part via load detecting part K1 in which strain detecting part 99 and strain generating member 90 are integrated. Thus, load detecting part K1 and actuator main body A1 are assembled separately and in parallel, and then can be assembled with vibration actuator 10. Thus, in comparison with a configuration in which the strain detecting part and the strain generating body are parts of the movable body of the actuator main body, it is not necessary to assemble actuator main body A1 after strain detecting part 99 is assembled, or to perform a reverse process thereof, and it is possible to achieve an improvement in the assembly efficiency.

Strain sensors 99-1 to 99-4 detect, as the push-in amount of touch screen 2, the strain amount of strain parts 97 that are displaced together with movable body 40 (yoke 41) when touch screen 2 to which surface-part fixing part 44 is fixed via strain generating member 90 is operated. The detected strain is outputted to the control part or the like, and a driving current generated so as to serve as the moving amount of movable body 40 in accordance with the strain is energized to coil 22, thereby core assembly 20 attracts and moves yoke 41.

The present embodiment is configured to include the control part that determines the moving amount of touch screen 2 by using strain detected by strain sensors 99-1 to 99-4 to realize vibration feedback for the contact, but the present invention is not limited thereto. The control part may also be configured to detect the push-in amount with respect to plate-shaped elastic part 50 in accordance with the actual moving amount of the operation device by using another sensor capable of detecting that the operator comes into contact with the operation device, and to realize expression of a more natural feeling by using the detection result.

Further, strain sensors 99-1 to 99-4 may be used to adjust the vibration period of movable body 40 (which may also include touch screen 2 as the operation device) when a driving current pulse is supplied by a current pulse supplying part of the control part based on a contact operation of the operator, that is, a detection result of the sensors that detect the push-in amount of movable body 40. Further, apart from strain sensors 99-1 to 99-4, an operation signal indicating an operation state may be outputted to the control part, in conjunction with a display form of a contact position of the operator detected by touch screen 2, such that vibration corresponding to the display form is generated, and the control part may perform control in accordance with the operation signal.

In strain generating member 90, strain sensors 99-1 to 99-4 may be provided at one position in strain part 97, that is, a portion between movable-body side fixing part 92 and presentation part-side fixing part 94, but are preferably provided at a plurality of positions. In the present embodiment, vibration actuator 10 is attached to the vibration presenting part (touch screen 2) so that strain sensors 99-1 to 99-4 are preferably provided at at least three positions so as to radially surround the center of the operation surface of the vibration presenting part (touch screen 2) at equal distances. Thus, vibration actuator 10 can receive displacement of touch screen 2, on which a pressing operation is performed, by the surface and displacement can be detected accurately.

In the present embodiment, strain sensors 99-1 to 99-4 are provided in four strain parts 97 near presentation part-side fixing parts 94 as the fixing positions to touch screen 2.

Thus, strain sensors 99-1 to 99-4 detect strain of frame-shaped corner parts surrounding the center of the pressing operation region of touch screen 2. Accordingly, in a case where a rectangular touch screen display is used as the vibration presenting part as in touch screen 2, actuator main body A1 can be attached to the display via load detecting part K1 in a well-balanced manner. Thus, the strain direction of strain generating member 90 can be stably matched with the surface perpendicular direction.

Figure 9:
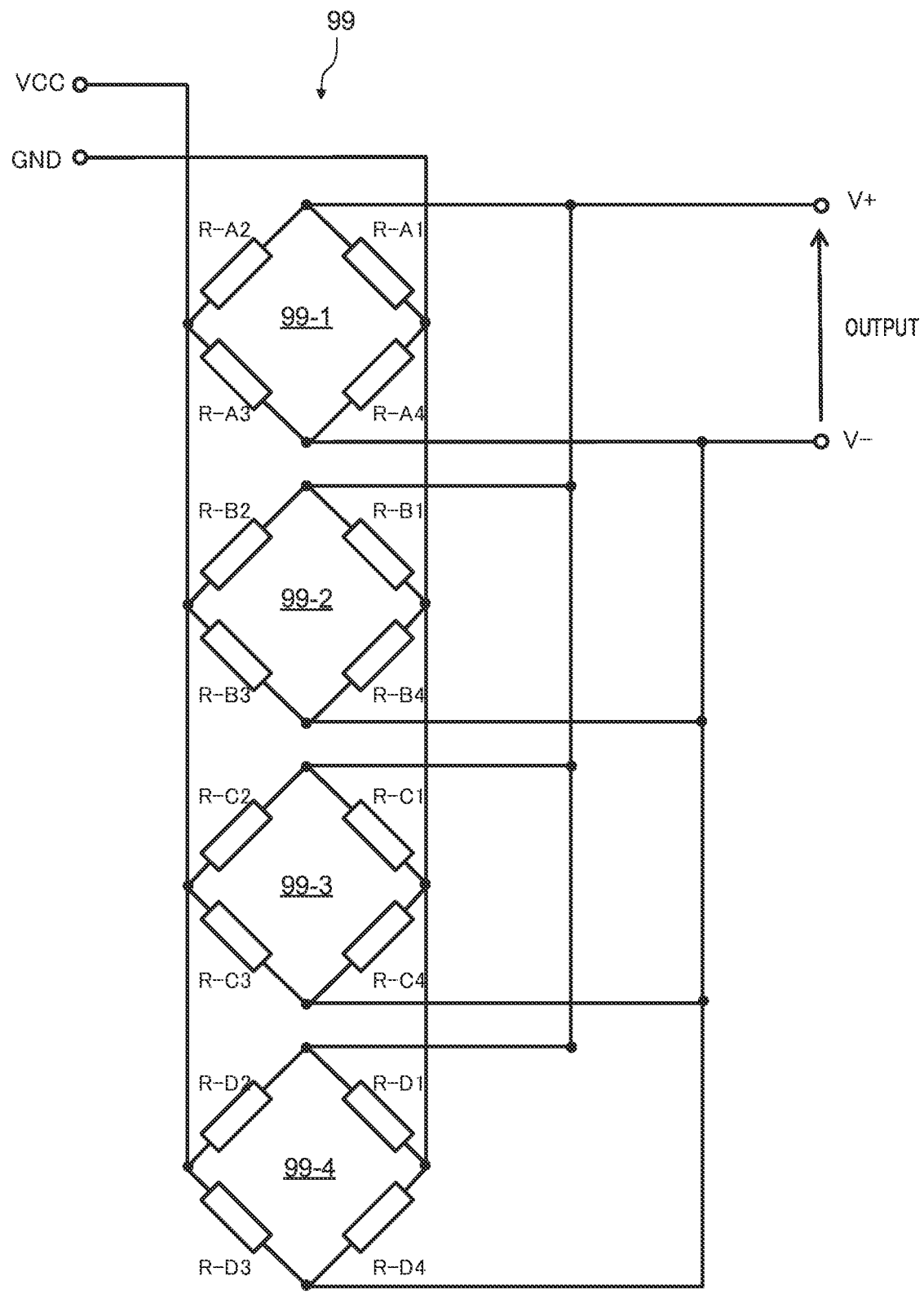
FIG. 9 illustrates wiring of a strain detecting part.

FIG. 9 illustrates wiring of strain detecting part 99.

Strain sensors 99-1 to 99-4 are disposed on strain generating member 90 and are located on the same plane, respectively.

Each of strain sensors 99-1 to 99-4 includes a plurality of strain gauge parts (R-A1 to R-A4, R-B1 to R-B4, R-C1 to R-C4, and R-D1 to R-D4), and is a full-bridge connection type strain sensor.

Strain sensors 99-1 to 99-4 are connected in parallel to power supply voltages Vcc and GND, are connected in parallel to each other, and are connected so as to output a change amount of an electrical resistance value that changes due to application of a load. Thus, outputs from strain sensor 99-1 to 99-4 are averaged, and a stable behavior is obtained. Further, although the output value may vary depending on the temperature for each of strain sensors 99-1 to 99-4, this temperature dependence can be mitigated by averaging so that the temperature stability of the behavior and further the reliability can be improved.

<Movement Regulating Part 96>

Movement regulating part 96 regulates relative movements of yoke 41 and base part 32 such that movable body 40 is not separated from fixing body 30, that is, yoke 41 is not separated from base part 32 by a predetermined distance or more.

Figure 10:
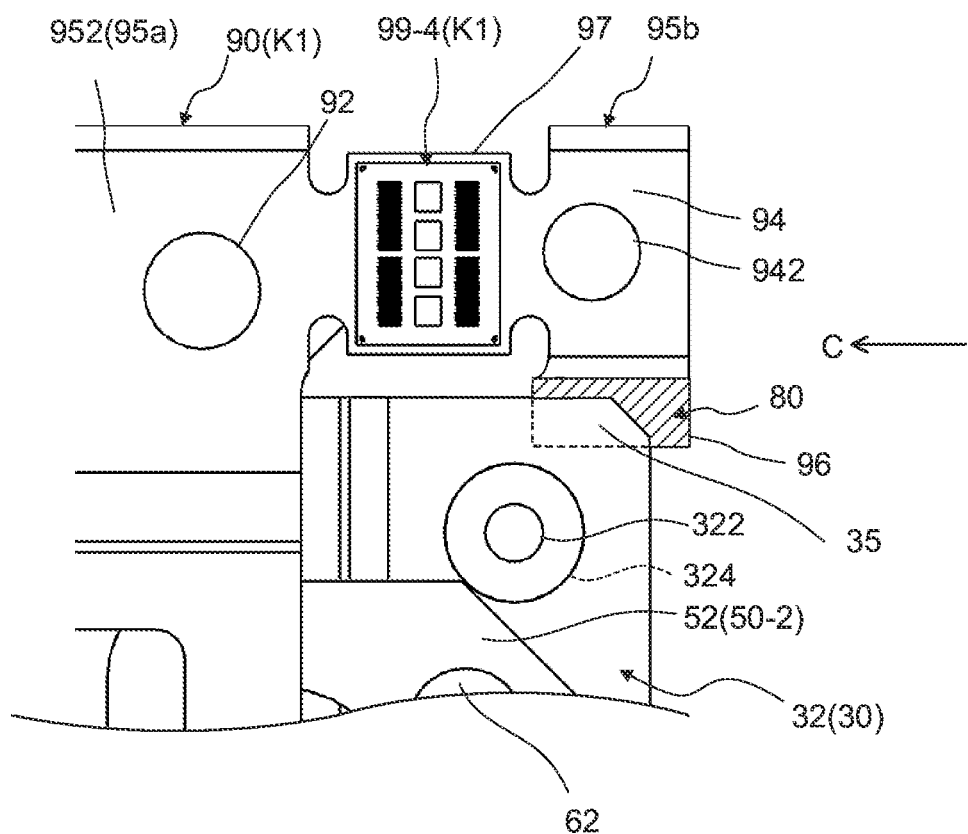
FIG. 10 is a partially enlarged front view of a movement regulating part of the vibration actuator.
Figure 11:
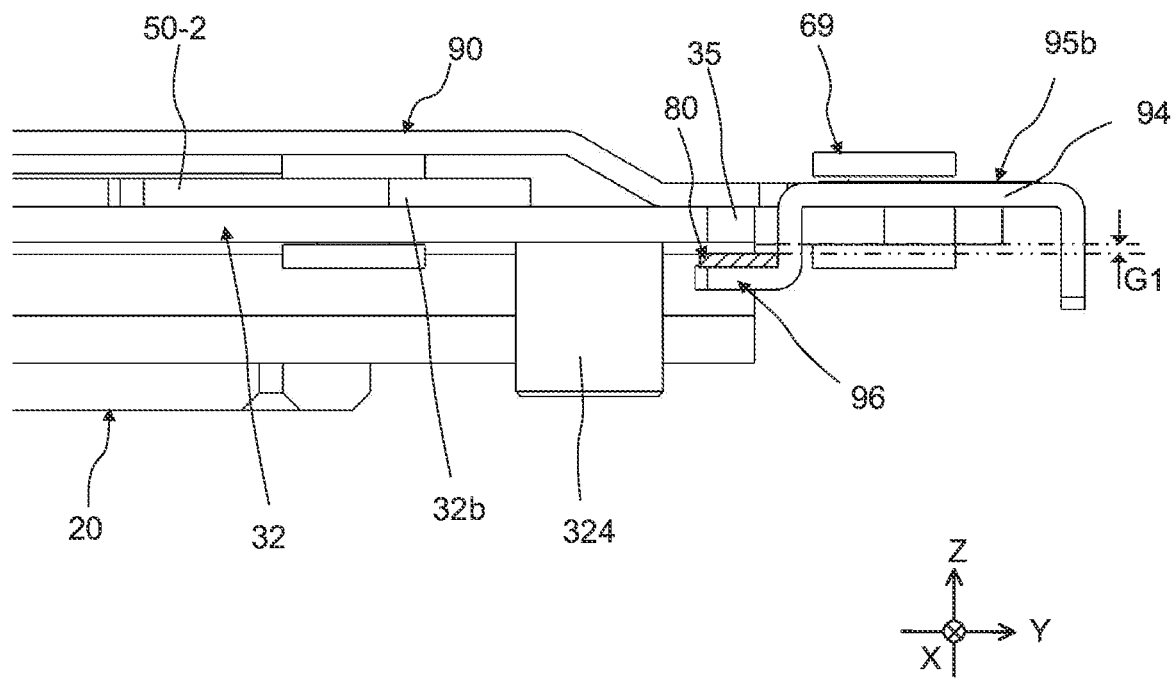
FIG. 11 is a partial right side view of the movement regulating part as viewed from C direction in FIG. 10.

FIG. 10 is a partially enlarged front view of a movement regulating part of the vibration actuator. FIG. 11 is a partial right side view of the movement regulating part as viewed from C direction in FIG. 10.

When movable body 40 moves in a direction separating from base part 32, movement regulating part 96 regulates movement of movable body 40 in the direction separating from base part 32 by engaging with engaged part 35 of base part 32 via buffer member 80.

In connecting-arm part 95b, movement regulating part 96 extends to a side of base part 32 (the inner side) from presentation part-side fixing part 94, which is provided on a side of a leading end rather than strain part 97, in the direction (the Y direction) orthogonal to the extending direction (the X direction) of connecting-arm part 95b in a plan view. More specifically, movement regulating part 96 is bent downward in an up-and-down direction corresponding to the vibration direction (the Z direction) at a position near presentation part-side fixing part 94, is further bent to a side of base part 32 in the Y direction at a position downward from attachment part 32a, and extends to a position facing engaged part 35 of attachment part 32a on the back surface side of attachment part 32a. Accordingly, movable body 40 is configured such that when movable body 40 moves in the direction separating from base part 32, movement regulating part 96 approaches engaged part 35 while moving in the same direction. Note that, in the present embodiment, engaged part 35 is provided in proximity to fixing hole 322 of fixing body 30. More specifically, engaged part 35 is provided in each of both side parts of attachment part 32a, which are separated from each other in the Y direction. In attachment part 32a, engaged part 35 is provided to protrude in a flange shape in the Y direction rather than a position to which fixing leg part 324 is attached. Fixing leg part 324 functions as a base fixing part that fixes base part 32 on a side of the base (a predetermined position).

In other words, the direction (the Y direction) in which movement regulating part 96 extends from the position of presentation part-side fixing part 94 is not on the extension line of the direction (the X direction) in which connecting-arm part 95b extends from presentation part-side fixing part 94. Further, movement regulating part 96 and strain part 97 are not in a positional relationship extending in directions opposite to each other with respect to presentation part-side fixing part 94. In this configuration, even when movement regulating part 96 collides with engaged part 35 with impact due to generation of a strong vibration or a strong impact from outside, the impact or reaction is hardly transmitted to strain part 97. Accordingly, it is possible to avoid occurrence of plastic deformation in strain part 97 due to a steep stress applied to strain part 97, and further it is possible to maintain the detection reliability of strain detecting part 99 (strain sensors 99-1 to 99-4) on strain part 97. In addition, it is possible to suppress a failure in the impact resistance of vibration actuator 10 (a failure that is generated when vibration actuator 10 receives an impact).

Movement regulating part 96 is provided with buffer member 80. Buffer member 80 reduces an impact in a collision between movement regulating part 96 and engaged part 35 by elastic deformation, and is formed of, for example, an elastomer such as silicone rubber or butyl rubber. Buffer member 80 formed of silicone rubber or butyl rubber is capable of preventing damage due to material deterioration and sustaining its effect in comparison with other materials such as a material including bubbles such as a sponge and a foam material.

Movement regulating part 96 engages with engaged part 35 on a side of fixing body 30 across buffer member 80.

On the side of fixing body 30, here, in attachment part 32a in base part 32, on the other hand, engaged part 35 that engages with movement regulating part 96 to regulate movement in directions opposite to each other is projected.

In the Z direction, that is, in the thickness direction of base part 32, engaged part 35 engages, via buffer member 80, with movement regulating part 96 that moves.

For example, as illustrated in FIG. 11, movement regulating part 96 when not driven is disposed such that gap G1 is formed between buffer member 80 and engaged part 35. That is, buffer member 80 is provided in movement regulating part 96 while being separated from engaged part 35 so as to abut on engaged part 35 when movement regulating part 96 moves in the direction separating from base part 32.

Thus, providing gap G1 and causing engaged part 35 to collide with movement regulating part 96 via buffer member 80 make it possible to prevent an impact on movement regulating part 96 in a state in which a tactile sense feeling presented by the vibration presenting part is not decreased but is maintained. Further, it is possible to suppress sound associated with a contact of both and to reduce noise.

That is, when a load is applied from outside, movement regulating part 96 is displaced so as to come in contact with engaged part 35 via buffer member 80 before core assembly 20 and movable body 40 (mainly yoke 41) come into contact with each other so that occurrence of a sound of collision between core assembly 20 and movable body 40 can be prevented.

Figure 12:
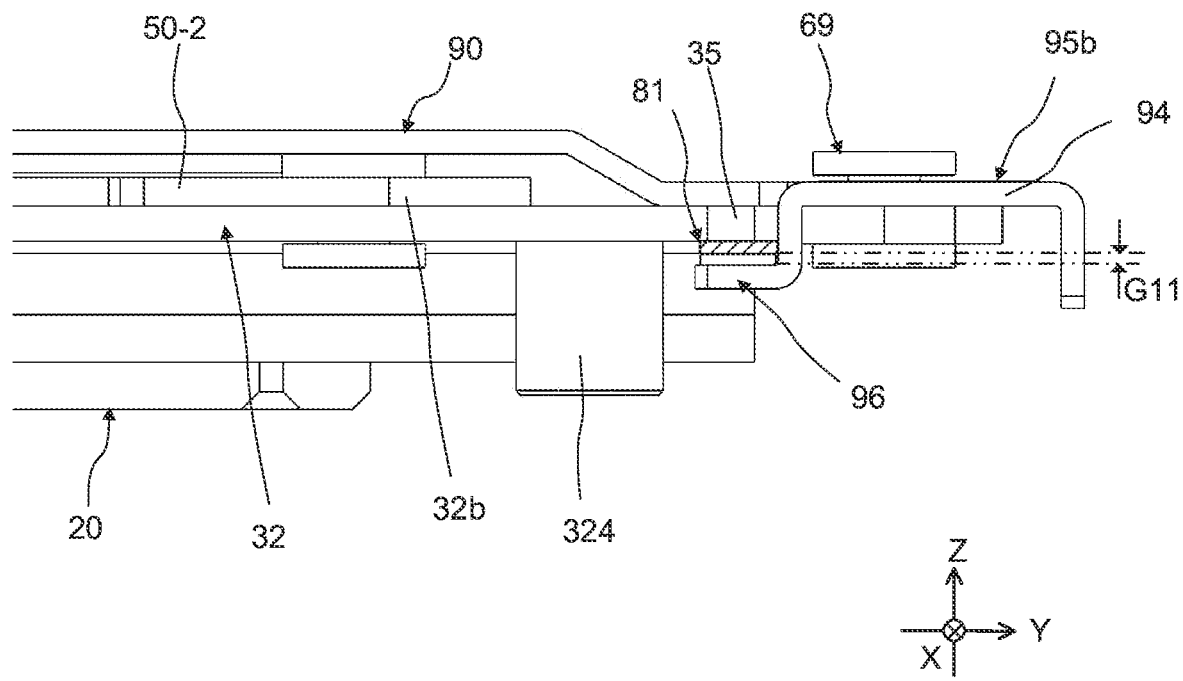
FIG. 12 illustrates Variation 1 of the movement regulating part as viewed from C direction in FIG. 10.

Further, as illustrated in FIG. 12, movement regulating part 96 when not driven may be disposed such that a gap is formed between movement regulating part 96 and buffer member 81. FIG. 12 illustrates Variation 1 of the movement regulating part as viewed from C direction in FIG. 10. As illustrated in FIG. 12, buffer member 81 that is configured in the same manner as buffer member 80 is provided in engaged part 35 while being separated from movement regulating part 96 so as to abut on movement regulating part 96 when movement regulating part 96 moves in the direction separating from base part 32.

Thus, providing gap Gil and causing engaged part 35 to collide with movement regulating part 96 via buffer member 81 make it possible to obtain the same effect as in the configuration in which gap G1 is provided between engaged part 35 and buffer member 80 illustrated in FIG. 11.

Figure 13:
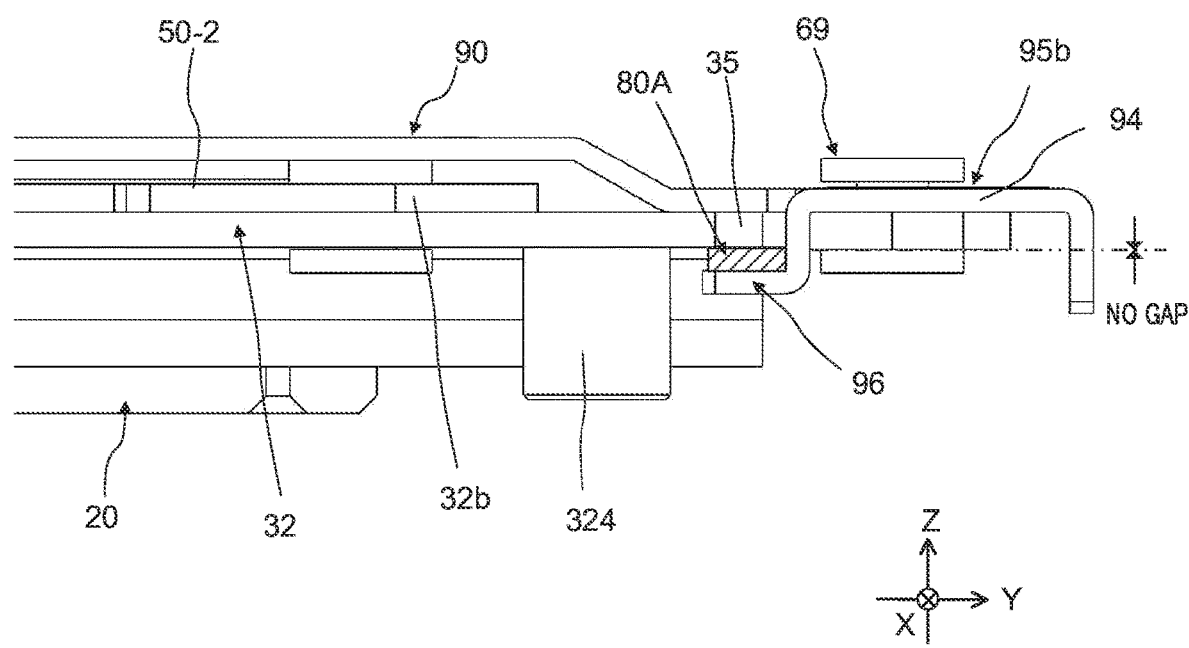
FIG. 13 illustrates Variation 2 of the movement regulating part as viewed from C direction in FIG. 10.

Further, there may be no distance between buffer member 80 and engaged part 35 in directions opposite to each other as illustrated in FIG. 13. FIG. 13 illustrates Variation 2 of the movement regulating part as viewed from C direction in FIG. 10. As illustrated in FIG. 13, buffer member 80A in a state of abutting on both movement regulating part 96 and engaged part 35 may be disposed between movement regulating part 96 and engaged part 35. Note that, buffer member 80A illustrated in FIG. 13 is formed of the same material as buffer member 80.

Buffer member 80A is disposed between movement regulating part 96 and engaged part 35 without a gap. Accordingly, in a case where a force to strongly push up movable body 40 due to a strong vibration or a load from outside is applied to movable body 40 and movable body 40 moves a distance longer than a gap, the influence of its impact can be stably suppressed. Further, it is possible to prevent occurrence of a sound of collision in a case where both come into direct contact with each other.

Further, since buffer member 80A is provided so as to fill a gap between movement regulating part 96 and engaged part 35, it is easy to perform dimensional management between movement regulating part 96 and engaged part 35 between which buffer member 80A is interposed.

Further, in yet another variation (not illustrated), a ring-shaped buffer member having such a diameter that an outer periphery part thereof is located between the movement regulating part and engaged part 35 may be externally fitted to fixing leg part 324.

When an impact is applied to vibration presenting apparatus 1, touch screen 2 may move in the surface perpendicular direction, and following this, strain generating member 90 and movable body 40 may move to a side of touch screen 2. In this case, movement regulating part 96 that moves along with the movement of strain generating member 90 engages with engaged part 35.

Thus, movement of movement regulating part 96 can be suppressed, movement of movable body 40 via strain generating member 90 can also be suppressed, and a load can be prevented from being applied to strain part 97 of strain generating member 90. Further, movement of movable body 40 to a side of fixing body 30 (the minus side in the Z direction) is suppressed by abutment of components of both, such as screws 68 on the side of fixing body 30 abutting on yoke 41. On the other hand, movement of strain generating member 90 to the side of fixing body 30 (the minus side in the Z direction) when an impact is received in vibration presenting apparatus 1 is regulated by engagement of movement regulating part 96 of strain generating member 90 with engaged part 35 on the rear surface of engaged part 35.

As described above, in vibration actuator 10 of the present embodiment, buffer member 80 (or buffer member 80A or 81) is provided so that it is possible to more surely suppress a collision between movement regulating part 96 and engaged part 35 with a strong impact and to more surely suppress plastic deformation of strain part 97 of strain generating member 90 even when a strong vibration occurs or there is a strong impact from outside. Thus, it is possible to improve the reliability of vibration actuator 10 and to give a long-term, stable contact operation feeling. That is, it is possible to suppress a failure in the impact resistance of vibration actuator 10.

Further, since a sound of collision between movement regulating part 96 and engaged part 35 is less likely to occur by disposing buffer member 80 (or buffer member 80A or 81) between movement regulating part 96 and engaged part 35, it is possible to improve sound-reducing property. Further, a strong impact applied in the vibration direction can be directly cushioned by disposing buffer member 80 (or buffer member 80A or 81) between engaged part 35 and movement regulating part 96 which, when movable body 40 moves in the direction separating from base part 32, moves in the same direction and approaches engaged part 35.

Further, touch screen 2 can be protected from a strong impact by vibration actuator 10 itself even without providing a stopper function in touch screen 2 itself as the vibration presenting part to which vibration actuator 10 is attached.

<Plate-Shaped Elastic Part 50 (50-1 and 50-2)>

In the present embodiment, plate-shaped elastic part 50 includes a pair of plate-shaped elastic parts 50-1 and 50-2. Each of plate-shaped elastic parts 50-1 and 50-2 movably supports movable body 40 with respect to fixing body 30. Plate-shaped elastic parts 50-1 and 50-2 support the upper surface of movable body 40 (the upper surface of core assembly 20 in the present embodiment) so as to be parallel to each other at the same depth as the upper surface of fixing body 30 or on a lower surface side than the upper surface of fixing body 30. Note that, plate-shaped elastic parts 50-1 and 50-2 have a symmetrical shape with respect to the center of movable body 40 and, in the present embodiment, are members formed in the same manner.

For example, plate-shaped elastic parts 50-1 and 50-2 may be disposed line symmetrically with respect to the center (the moving center) of movable body 40 on the XY plane, and the number thereof may be more than two. Each of plate-shaped elastic parts 50-1 and 50-2 is fixed to fixing body 30 on a side of one end thereof, is fixed to movable body 40 on a side of the other end thereof, and movably supports movable body 40 with respect to fixing body 30 in the vibration direction (the Z direction).

In order to ensure elasticity, plate-shaped elastic part 50 includes a meander-shaped part having a meander shape, which is provided between movable body 40 and fixing body 30 and is elastically deformed. Plate-shaped elastic part 50 elastically supports movable body 40 with respect to fixing body 30 such that movable body 40 is movable in the Z direction in which at least one of attracted surface parts 46 and 47 of movable body 40 faces at least one end part (magnetic pole part 242 or magnetic pole part 244) of the both end parts (magnetic pole parts 242 and 244) of core 24. For example, plate-shaped elastic part 50 may elastically support movable body 40 with respect to fixing body 30 (core assembly 20) such that movable body 40 is movable in the Z direction in which one of attracted surface parts 46 and 47 faces one end part of core 24. Plate-shaped elastic part 50 is disposed to extend on the XY plane orthogonal to the vibration direction (the Z direction).

Plate-shaped elastic part 50 is disposed substantially parallel to magnetic pole parts 242 and 244 such that yoke 41 faces magnetic pole parts 242 and 244 of core 24 of fixing body 30 in the vibration direction (the Z direction) with gap G between yoke 41 and magnetic pole parts 242 and 244.

Plate-shaped elastic part 50 movably supports the upper surface of movable body 40 in the vibration direction at a position on a side of bottom surface part 32b rather than a level that is substantially the same as the depth level of the upper surface of core assembly 20.

Plate-shaped elastic part 50 is a plate spring (spring plate material), and includes fixing-body side fixing parts 52, movable-body side fixing parts 54, elastic arm parts 56 having a meander shape as a meander-shaped part that communicates fixing-body side fixing part 52 with movable-body side fixing part 54.

Plate-shaped elastic part 50 attaches fixing-body side fixing parts 52 to the front surfaces of attachment parts 32a, attaches movable-body side fixing parts 54 to the front surfaces of attracted surface parts 46 and 47 of yoke 41, and attaches movable body 40 with elastic arm parts 56 parallel to bottom surface parts 32b.

Fixing-body side fixing parts 52 are joined and fixed to attachment parts 32a in surface contact therewith by screws 62. Movable-body side fixing parts 54 are joined and fixed to attracted surface parts 46 and 47 in surface contact therewith by screws 64.

By including the meander-shaped part, elastic arm part 56 ensures a length that allows deformation required for vibration of movable body 40 between fixing-body side fixing part 52 and movable-body side fixing part 54 and on the plane (the XY plane formed in the X direction and the Y direction) orthogonal to the vibration direction.

Specifically, elastic arm part 56 has a shape that extends in directions opposite to fixing-body side fixing part 52 and movable-body side fixing part 54 and is folded back. In elastic arm part 56, end parts to be joined to fixing-body side fixing part 52 and movable-body side fixing part 54, respectively, are formed at positions shifted in the Y direction. Elastic arm parts 56 are disposed at positions of point symmetry or line symmetry with respect to the center of movable body 40.

Thus, movable body 40 is supported on the both sides by elastic arm parts 56 having a meander-shaped spring so that stress dispersion at the time of elastic deformation is possible. That is, plate-shaped elastic part 50 is capable of moving movable body 40 in the vibration direction (the Z direction) without movable body 40 tilting with respect to core assembly 20, and is capable of achieving an improvement in the reliability of the vibration state.

Each plate-shaped elastic part 50 includes at least two or more elastic arm parts 56. Thus, in comparison with a case where each plate-shaped elastic part 50 includes one elastic arm part, plate-shaped elastic part 50 enables a stress at the time of elastic deformation to be dispersed to achieve an improvement in the reliability, and enables the balance of the support with respect to movable body 40 to be improved to achieve an improvement in the stability.

In the present embodiment, plate-shaped elastic part 50 is made of a magnetic material. Further, movable-body side fixing parts 54 of plate-shaped elastic part 50 are disposed on the upper sides of the both end parts (magnetic pole parts 242 and 244) of core 24, and function as magnetic paths. In the present embodiment, movable-body side fixing parts 54 are fixed in a stacked state on the upper sides of attracted surface parts 46 and 47. Thus, thickness (the Z direction, the length in the vibration direction) H (see FIG. 8) of attracted surface parts 46 and 47 facing magnetic pole parts 242 and 244 of the core assembly can be increased as the thickness of the magnetic material.

In the present embodiment, the thickness of plate-shaped elastic part 50 and the thickness of yoke 41 are the same so that the cross-sectional areas of portions of the magnetic material where the portions face magnetic pole parts 242 and 244 can be doubled. Thus, in comparison with a case where the plate spring is non-magnetic, it is possible to mitigate a decrease in characteristics due to magnetic saturation in the magnetic circuit by expanding the magnetic circuit to achieve an output improvement.

<Magnetic Circuit of Vibration Actuator 10>

Further, movable-body side fixing parts 54 are disposed so as to cover, among portions of attracted surface parts 46 and 47 where the portions face magnetic pole parts 242 and 244, portions, where notches 49 are formed, from above. Thus, movable-body side fixing parts 54 can receive magnetic fluxes passing through notches 49 when coil 22 is energized.

Figure 14:
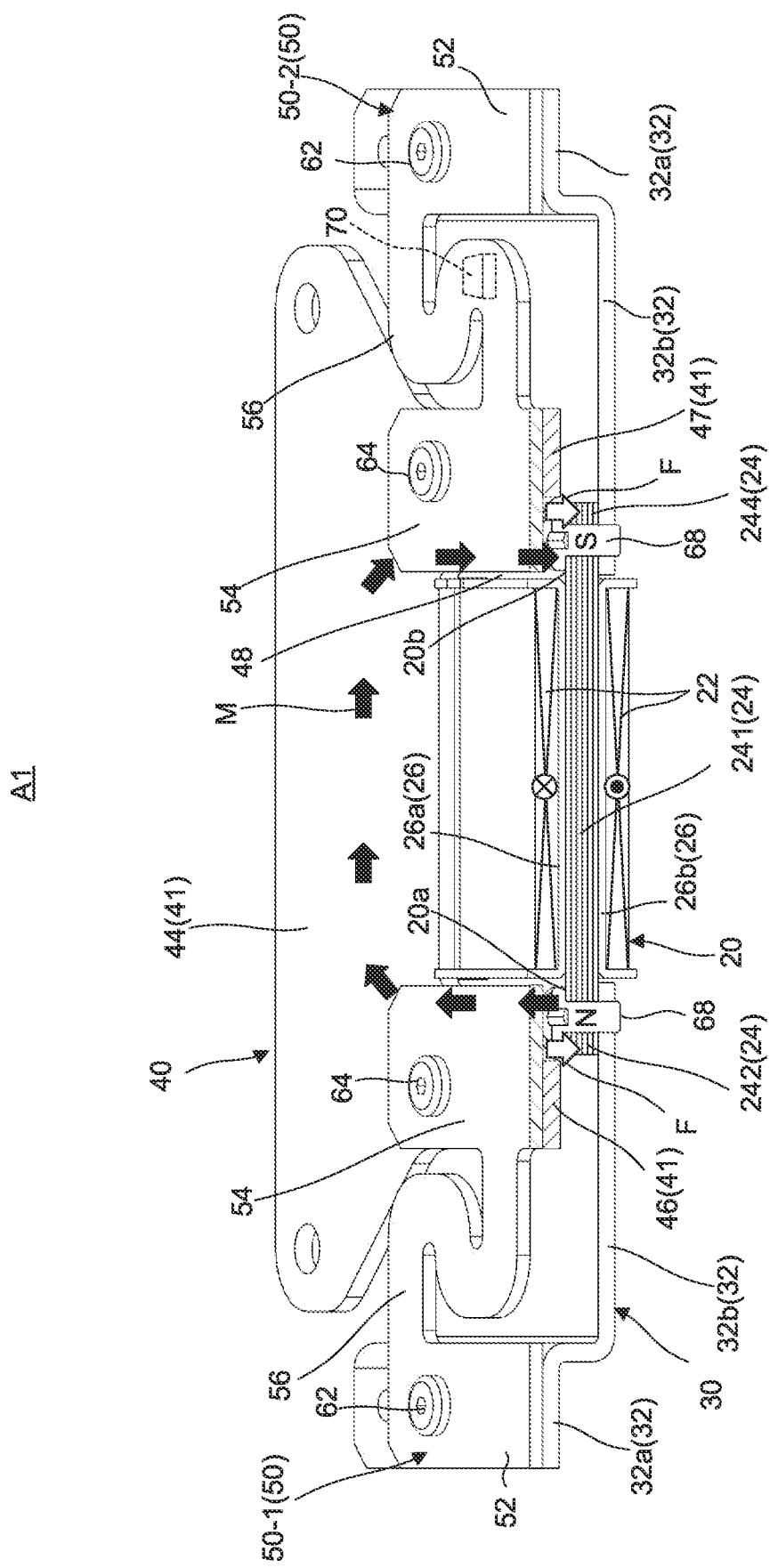
FIG. 14 illustrates a magnetic circuit configuration of the actuator main body.

FIG. 14 illustrates a magnetic circuit in vibration actuator 10. Note that, FIG. 14 is a perspective view of actuator main body A1 illustrating a portion cut by line B-B of FIG. 7. The magnetic circuit includes magnetic flux flow M that is the same in a portion in which magnetic flux flow M is not illustrated as well as in a portion in which magnetic flux flow M is illustrated.

Further, FIGS. 15A and 15B are cross-sectional views schematically illustrating the movement of movable body 40 by the magnetic circuit. Specifically, FIG. 15A illustrates a state in which movable body 40 is held at a position separated from core assembly 20 by plate-shaped elastic part 50, and FIG. 15B illustrates movable body 40 that is attracted and moved to a side of core assembly 20 by a magnetomotive force by the magnetic circuit.

Specifically, when coil 22 is energized, core 24 is excited to generate a magnetic field, and the both end parts of core 24 become magnetic poles. For example, in FIG. 14, magnetic pole part 242 is the N-pole and magnetic pole part 244 is the S-pole in core 24. Thus, the magnetic circuit indicated by magnetic flux flow M is formed between core assembly 20 and yoke 41. Magnetic flux flow M in the magnetic circuit flows from magnetic pole part 242 to attracted surface part 46 of yoke 41, where attracted surface part 46 faces magnetic pole part 242, passes through surface-part fixing part 44 of yoke 41, and reaches magnetic pole part 244, which faces attracted surface part 47, from attracted surface part 47. In the present embodiment, plate-shaped elastic part 50 is also a magnetic material so that the magnetic flux (illustrated as magnetic flux flow M) flown to attracted surface part 46 passes through attracted surface part 46 of yoke 41 and movable-part side fixing parts 54 and reaches attracted surface part 47 and both end parts of movable-body side fixing part 54 of plate-shaped elastic part 50-2 from both end parts of attracted surface part 46 via surface-part fixing part 44.

Thus, magnetic pole parts 242 and 244 of core assembly 20 generate attraction force F that attracts attracted surface parts 46 and 47 of yoke 41 by the principle of electromagnetic solenoid. Thereby, attracted surface parts 46 and 47 of yoke 41 are attracted to both of magnetic pole parts 242 and 244 of core assembly 20. Thus, coil 22 is inserted into opening part 48 of yoke 41, and movable body 40 including yoke 41 moves in the direction of attraction force F (the minus Z direction) against the urging force of plate-shaped elastic part 50 (see FIGS. 15A and 15B).

Further, when energization to coil 22 is stopped, the magnetic field disappears, attraction force F of core assembly 20 for movable body 40 is lost, and movable body 40 moves back to its original position (moves in the plus Z direction opposite to the direction of attraction force F) by the urging force of plate-shaped elastic part 50.

By repeating the above, in actuator main body A1, movable body 40 reciprocatingly moves so that vibration in the vibration direction (the Z direction) can be generated.

By linearly and reciprocatingly moving movable body 40, touch screen 2 as the operation device to which movable body 40 is fixed, is also displaced in the Z direction following movable body 40. In the present embodiment, the displacement of movable body 40 due to driving, that is, the displacement amount of touch screen 2 ranges from 0.03 mm to 0.3 mm.

This displacement amount range is a range that makes it possible to give vibration corresponding to a display pressed by the operator on screen 2a of touch screen 2 as the operation device. For example, in a case where a display to be pressed by the operator on screen 2a is a mechanical button or various switches, the displacement amount range is a range of amplitude that makes it possible to give the same tactile feeling as when the mechanical button or various switches are actually pressed. This range is set on the basis that a small displacement of the amplitude of movable body 40 results in an insufficient tactile feeling and a large displacement of the amplitude of movable body 40 results in a feeling of discomfort.

In actuator main body A1, it is possible to increase the efficiency of the magnetic circuit and to achieve a high output by disposing attracted surface parts 46 and 47 of yoke 41 in proximity to magnetic pole parts 242 and 244 of core assembly 20. Further, actuator main body A1 uses no magnet and therefore has a low-cost structure.

The meander-shaped springs as plate-shaped elastic part 50 enable stress dispersion and makes it possible to achieve an improvement in the reliability. In particular, since movable body 40 is supported by the plurality of plate-shaped elastic parts 50-1 and 50-2, more effective stress dispersion is possible. Thus, by driving in the up-and-down direction, actuator main body A1 is capable of providing a direct feeling to the operator who comes into contact with screen 2a in the up-and-down direction.

Core assembly 20 including core 24 around which coil 22 is wound is fixed to fixing body 30, and core assembly 20 is disposed within opening part 48 of yoke 41 of movable body 40 which is movably supported in the Z direction with respect to fixing body 30 by plate-shaped elastic part 50. Thus, members provided in the fixing body and the movable body, respectively, in order to generate magnetism to drive the movable body in the Z direction are not required to be provided in an overlapping manner in the Z direction (for example, a coil and a magnet are disposed to face each other in the Z direction). Accordingly, it is possible to reduce the thickness of actuator main body A1 as the electromagnetic actuator in the Z direction. Further, linearly and reciprocatingly moving movable body 40 without using a magnet makes it possible to give vibration as a tactile sense feeling to the operation device. Thus, since the support structure is simple, the design becomes simple, space reduction can be achieved, and a reduction in the thickness of actuator main body A1 can be achieved. Further, since it is not an actuator using a magnet (it is an actuator including no permanent magnet), cost reduction can be achieved in comparison with a configuration in which a magnet is used.

<Driving Principle of Vibration Actuator 10>

Hereinafter, the driving principle of actuator main body A1 will be briefly described. Actuator main body A1, that is, vibration actuator 10 can also be driven by generating a resonance phenomenon with a pulse by using the following motion equation and circuit equation. Note that, the operation does not involve resonance driving, but involves expressing an operational feeling of a mechanical switch displayed on the touch screen as the operation device. In the present embodiment, the driving is performed by inputting a plurality of current pulses via the control part (for example, microcomputer 220 illustrated in FIG. 17).

Note that, movable body 40 in actuator main body A1 performs reciprocating movement based on expressions 1 and 2.

(Expression 1)

$$m\frac{d^2x(t)}{dt^2} = K_f i(t) - K_{sp}x(t) - D\frac{dx(t)}{dt} \quad [1]$$

m: Mass [kg]
x(t): Displacement [m]
$K_f$: Thrust constant [N/A]
i(t): Current [A]
$K_{sp}$: Spring constant [N/m]
D: Attenuation coefficient [N/(m/s)]

(Expression 2)

$$e(t) = Ri(t) + L\frac{di(t)}{dt} + K_e\frac{dx(t)}{dt} \quad [2]$$

e(t): Voltage [V]
R: Resistance [Ω]
L: Inductance [H]
$K_e$: Counter electromotive force constant [V/(rad/s)]

That is, mass m [kg], displacement x(t) [m], thrust constant $K_f$ [N/A], current i(t) [A], spring constant $K_{sp}$ [N/m], and attenuation coefficient D [N/(m/s)] in actuator main body A1 can be changed as appropriate within the range satisfying expression 1. Further, voltage e(t) [V], resistance R [Ω], inductance L [H], and counter electromotive force constant $K_e$ [V/(rad/s)] can be changed as appropriate within the range satisfying expression 2.

Thus, the driving of actuator main body A1 is determined based on mass m of movable body 40, and spring constant $K_{sp}$ of the metal springs (elastic bodies; plate springs in the present embodiment) as plate-shaped elastic part 50.

Further, in actuator main body A1, screws 62 and 64 as the fastening members are used for fixing base part 32 and plate-shaped elastic part 50 and for fixing plate-shaped elastic part 50 and movable body 40. Thus, plate-shaped elastic part 50 required to be firmly fixed to fixing body 30 and movable body 40 for driving of movable body 40 can be mechanically and firmly fixed in a state that allows reworking.

<Control of Vibration Actuator>

Actuator main body A1 is controlled by the control part, and the control part causes the operation device, which is supported to be elastically vibratable, to be driven in one direction in the vibration direction thereof.

Vibration actuator 10 moves to the plus side in the Z direction by supplying a driving current to coil 22 in accordance with a contact operation to the operation device to generate a magnetic field, moving movable body 40, which is elastically vibratable, in one direction with respect to fixing body 30, here to the minus side in the Z direction, and eliminating the magnetic field. Thus, when the operator comes into contact with touch screen 2 (see FIG. 1), the operator is given vibration as a tactile feeling. In the present embodiment, the contact operation is a signal detected by strain sensors 99-1 to 99-4, but in addition to this, a signal indicating a contact state inputted from touch screen 2 may be used, for example.

In vibration actuator 10, a single current pulse or a plurality of current pulses as an actuator driving signal for driving vibration actuator 10 is supplied to coil 22 by the control part. In the present embodiment, the actuator driving signal is formed of a plurality of current pulse trains.

By the current pulse supply to coil 22, movable body 40 is displaced by being drawn to a side of coil 22, that is, to the minus side in the Z direction by a magnetic attraction force against the urging force of plate-shaped elastic part 50. Following this, the touch screen (vibration presenting part) fixed to movable body 40 also moves to the minus side in the Z direction with respect to the base (not illustrated) to which fixing body 30 is fixed.

Further, by stopping the driving current supply to coil 22, the urging force is released, and a holding state of movable body 40 at a position on the minus side in the Z direction with respect to the reference position is released. Thus, movable body 40 is urged to move from its maximum displacement position on the minus side in the Z direction to a direction (the plus side in the Z direction) opposite to a direction in which movable body 40 is drawn (the minus side in the Z direction) by the urging force of the plate-shaped elastic part 50, and feeds back the vibration.

The actuator driving signal can be generated in various types of vibration forms by the amplitude of each pulse in a single current pulse or a plurality of current pulse trains, each wavelength, each supply timing, and the like, and can be supplied to actuator main body A1. Thus, the vibration of actuator main body A1 is given as a body feeling to the operator.

For example, the control part includes a current pulse supplying part and a voltage pulse applying part.

The current pulse supplying part supplies coil 22 of vibration actuator 10 with a plurality of driving current pulses as a driving current for driving the operation device (vibration presenting part) in accordance with a contact operation to the operation device.

The voltage pulse applying part intermittently applies a plurality of control voltage pulses, each of which generates a single current pulse or a plurality of current pulse trains that forms an actuator driving signal, to the current pulse supplying part.

<Driving Circuit of Actuator Main Body A1>

Figure 16:
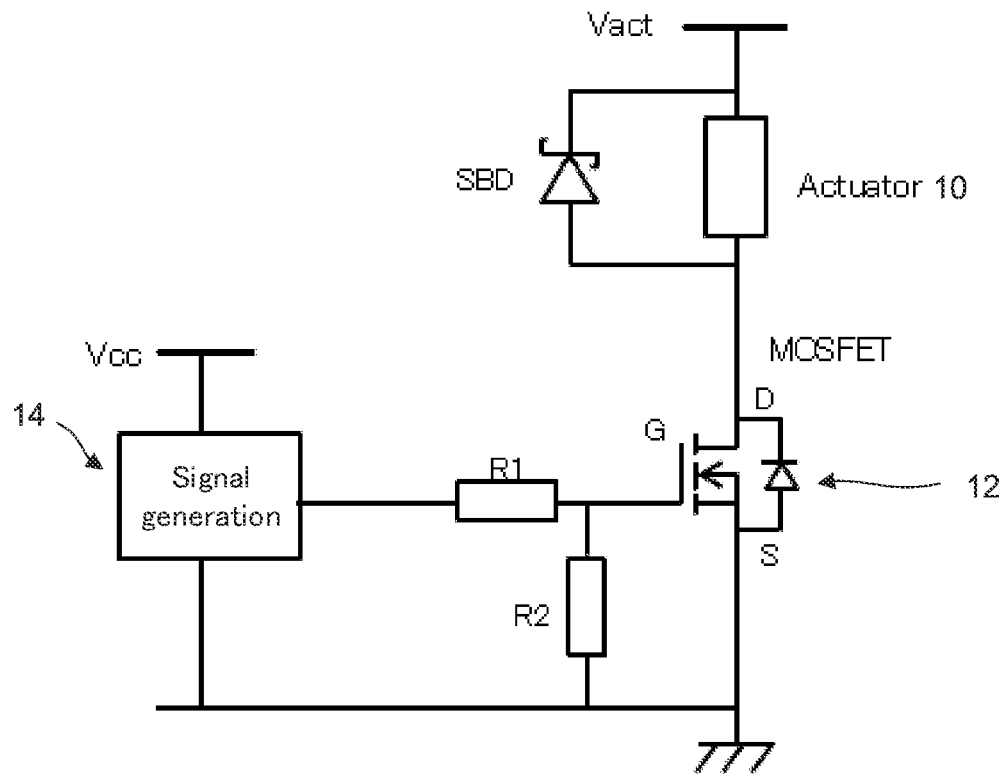
FIG. 16 is a diagram provided for describing a control part of the actuator main body.

FIG. 16 illustrates an example of a driving circuit of the actuator main body.

The driving circuit illustrated in FIG. 16 is included in the control part. The driving circuit includes switching element 12 as the current pulse supplying part formed of a MOSFET (metal-oxide-semiconductor field-effect transistor), signal generation 14 as the voltage pulse applying part, resistors R1 and R2, and SBD (Schottky barrier diodes). This driving circuit is an example of a specific configuration of actuator driver 230 to be described later.

In the control part, signal generation 14 connected to power supply voltage Vcc is connected to a gate of switching element 12. Switching element 12 is a discharge changeover switch. Switching element 12 is connected to actuator main body A1 (indicated by [Actuator] in FIG. 16) and SBD, and is connected to a vibration actuator, specifically actuator main body A1, to which a voltage is supplied from power supply part Vact.

Note that, albeit not illustrated, the control part may include a central processing unit (CPU), a read only memory (ROM), a random access memory (RAM), and the like for controlling operation of the components of vibration presenting apparatus 1. The CPU reads a program corresponding to processing content from the ROM, develops the program in the RAM, and cooperates with the developed program to control operation of the components of vibration presenting apparatus 1 including vibration actuator 10. At this time, reference is made to various data including various vibration attenuation period generation patterns stored in a storage part (not illustrated). The storage part (not illustrated) may be formed of, for example, a non-volatile semiconductor memory (so-called flash memory) or the like. For example, the storage part, the ROM, the RAM, or the like stores pulse waveform data of a plurality of various patterns of a plurality of pulse trains. The ROM stores various programs for controlling vibration presenting apparatus 1, which include a vibration presenting program for presenting vibration by driving actuator main body A1. Examples of the vibration presenting program include a program for reading pulse waveform data to generate an actuator driving signal that generates vibration corresponding to contact information when information indicating a contact state is inputted from strain sensors 99-1 to 99-4.

Further, examples of the vibration presenting program include a program for generating an actuator driving signal corresponding to contact information by combining read data, and a program for supplying a generated actuator driving signal to coil 22. The actuator driving signal is applied as a combination of a plurality of current pulses to coil 22 via a driving circuit that drives actuator main body A1. The CPU (for example, microcomputer 220 to be described later) may use these programs and data to control operation of the components of vibration presenting apparatus 1, and may control the current pulse supplying part and the voltage pulse applying part. For example, signals from strain sensors 99-1 to 99-4 are amplified by an amplification part (for example, amplification part (amplifier) 250 to be described later), are analog-to-digital converted by a conversion part (for example, conversion part (ADC) 260 to be described later), and are outputted to the CPU to vibrate vibration actuator 10 by the driving circuit illustrated in FIG. 16.

The control part causes a current pulse to be supplied to coil 22 to drive movable body 40 such that movable body 40 is displaced in one direction (the minus Z direction and the minus side in the Z direction) of the vibration direction against the urging force of plate-shaped elastic parts 50. During the current pulse supply, the displacement of movable body 40 in the one direction of the vibration direction is continued. By stopping the current pulse supply, that is, turning off the input of the current pulse to coil 22, the force to displace movable body 40 in the one direction of the vibration direction is released. Turning off the input of the current pulse means that a timing when the voltage generating the current pulse is turned off. At the timing when the voltage is switched off, the current pulse is not completely switched off, but is in a state of being attenuated.

When the voltage is switched off, movable body 40 is displaced by moving to the other direction (the Z direction and the plus side in the Z direction) of the vibration direction by the urging force of plate-shaped elastic part 50 accumulated at a maximum displaceable position in a direction in which movable body 40 is drawn (the minus side in the Z direction). A strong vibration is propagated to touch screen (operation device) 2 via movable body 40 which has moved to a side of the other direction, which is a side of the operation device, and a tactile feeling is given to the operator.

The control part causes one or more current pulses to be supplied to coil 22 in accordance with the operator's contact with the screen of the touch screen based on information from strain sensors 99-1 to 99-4. In the vibration of movable body 40, the control part causes a first pulse to be supplied, and further adjusts vibration or the like that remains and continues after the stop of the supply of the first pulse by a pulse(s) to be supplied thereafter.

<Schematic Configuration of Control System of Vibration Presenting Apparatus 1>

Figure 17:
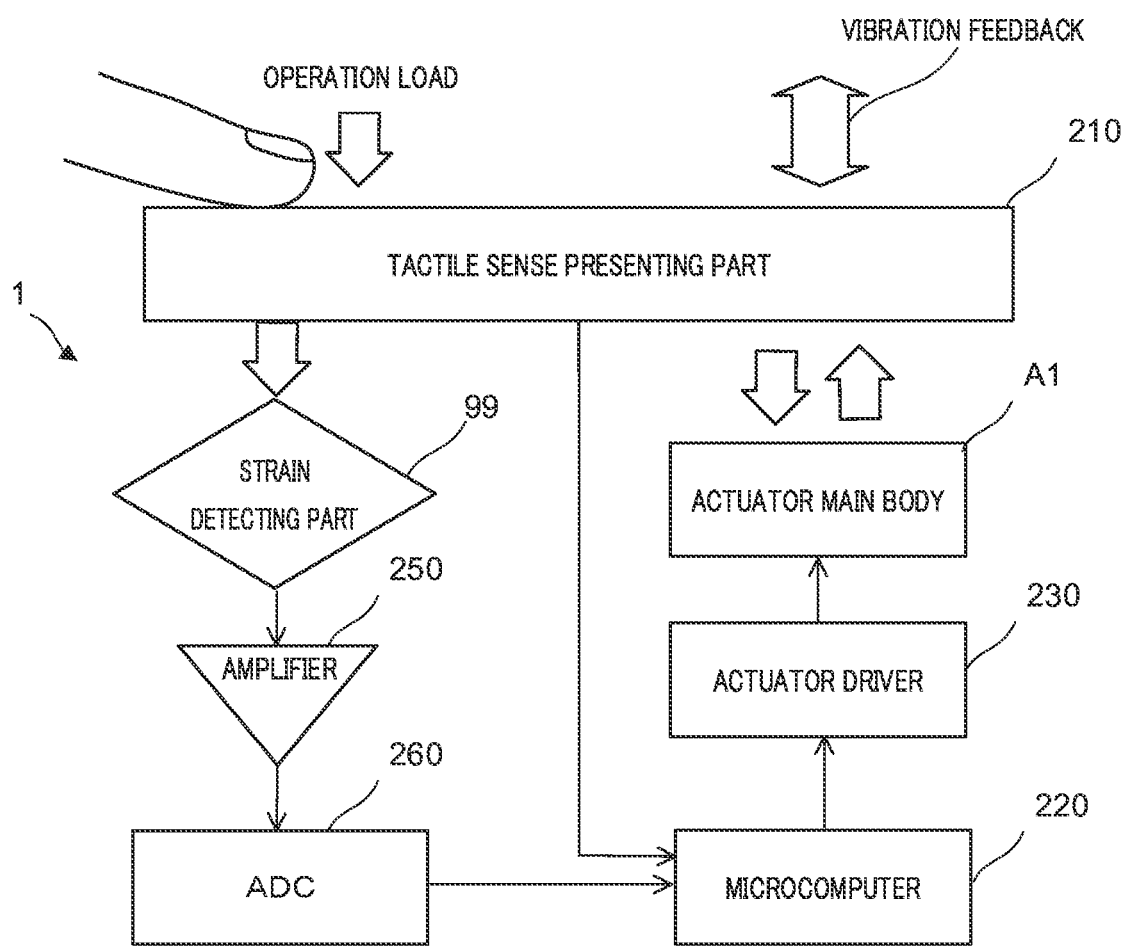
FIG. 17 schematically illustrates a control system of the vibration presenting apparatus.

FIG. 17 schematically illustrates a control system of vibration presenting apparatus 1.

Vibration presenting apparatus 1 includes tactile sense presenting part 210, strain detecting part 99, amplification part (amplifier) 250, AD conversion part (ADC) 260, microcomputer 220, actuator driver 230, and actuator main body A1. An example of tactile sense presenting part 210 is touch screen 2 described above.

For example, touch screen 2 as tactile sense presenting part 210 includes a contact position detecting part (not illustrated) that receives a contact operation of the operator on touch screen 2 and outputs a contact position thereof. A signal from the contact position detecting part (not illustrated) is outputted to microcomputer 220 or to the control part of the entire apparatus. Strain detecting part 99 detects strain of strain generating member 90 at load detecting part K1 by pressing of tactile sense presenting part 210. The detected signal is inputted to microcomputer 220 included in the control part via amplification part 250 and ADC 260.

Microcomputer 220 controls actuator driver 230 such that vibration corresponding to a contact operation is generated in accordance with inputted signals, that is, contact position information from the contact position detecting part, a driving timing, and a strain signal. That is, microcomputer 220 outputs an actuator driving signal to and supplies a driving current to the actuator (actuator main body A1) via actuator driver 230.

Actuator main body A1 that has received the driving current supplied from actuator driver 230 transmits vibration to tactile sense presenting part 210 to cause vibration, thereby causing tactile sense presenting part 210 to present vibration corresponding to a contact position outputted from tactile sense presenting part 210.

Thus, the operator's operation received by tactile sense presenting part 210 such as the touch screen is received, and actuator main body A1 is driven correspondingly.

When an actuator drive signal is inputted to actuator main body A1, actuator main body A1 moves movable body 40, specifically yoke 41, and strain generating member 90 by a magnetic attraction force in one direction, for example, to the minus side in the Z direction against the urging force.

Further, when the input of the actuator driving signal to actuator main body A1 is stopped, actuator main body A1 releases the urging force and moves movable body 40 to a side of the other direction (the plus side in the Z direction) by the urging force. Actuator main body A1 vibrates movable body 40 and the operation device by inputting and stopping the actuator driving signal. Actuator main body A1 drives movable body 40 without using a magnet to vibrate the operation device.

Note that, in the embodiment, the actuator driving signal corresponds to a plurality of driving current pulse (also referred to as "current pulse") trains that is supplied to coil 22 as a driving current for driving the movable body and the operation device. In actuator main body A1, when a current pulse is supplied to coil 22, the movable body moves in one direction. By repeating this operation, the movable body vibrates.

Thus, vibration presenting apparatus 1 of the present embodiment realizes a realistic tactile feeling expression such as a feeling of a switch by a realistic tactile feeling expression based on load detection.

Embodiment 2

Figure 18:
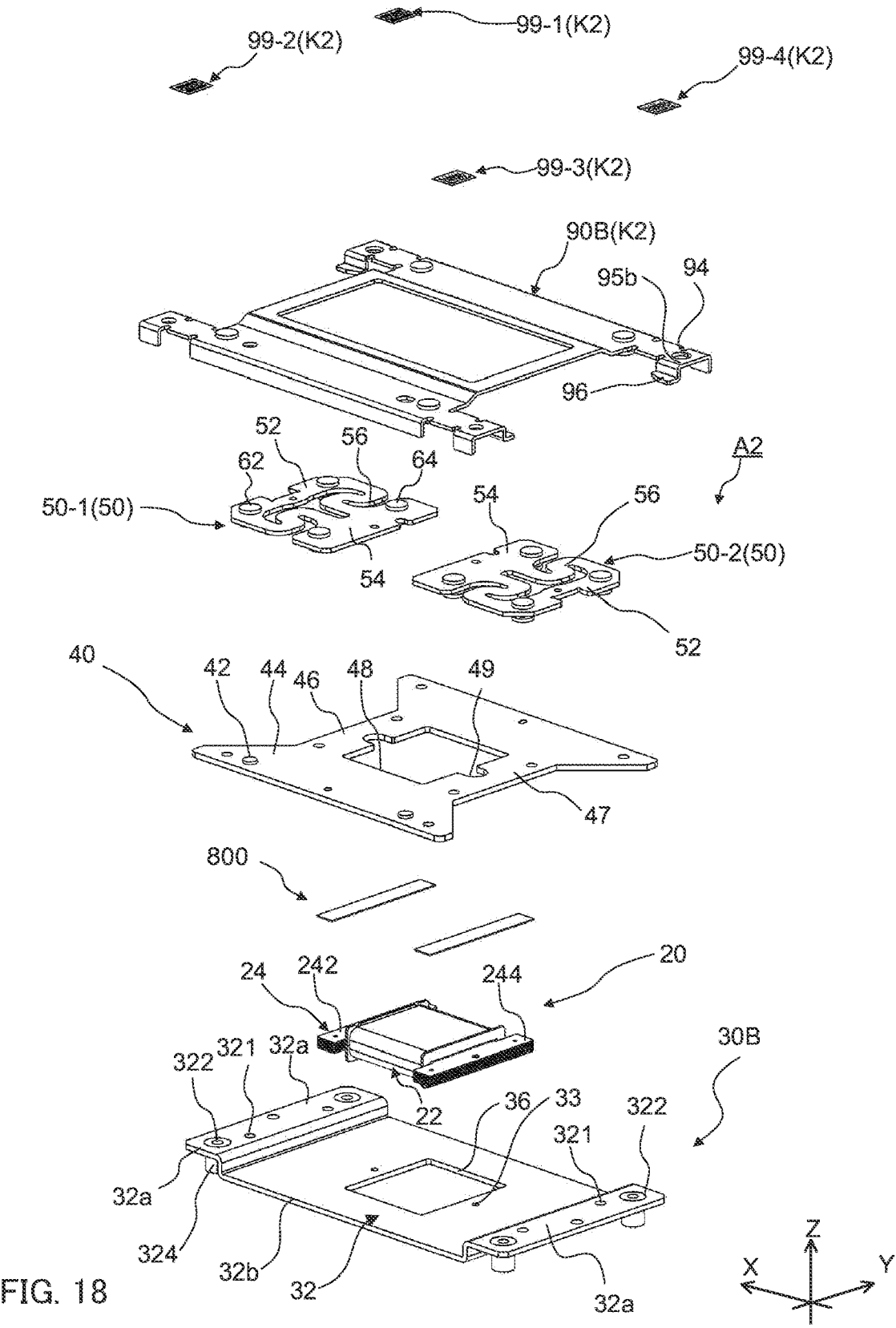
FIG. 18 is an exploded perspective view of a vibration actuator according to Embodiment 2 of the present invention.
Figure 19:
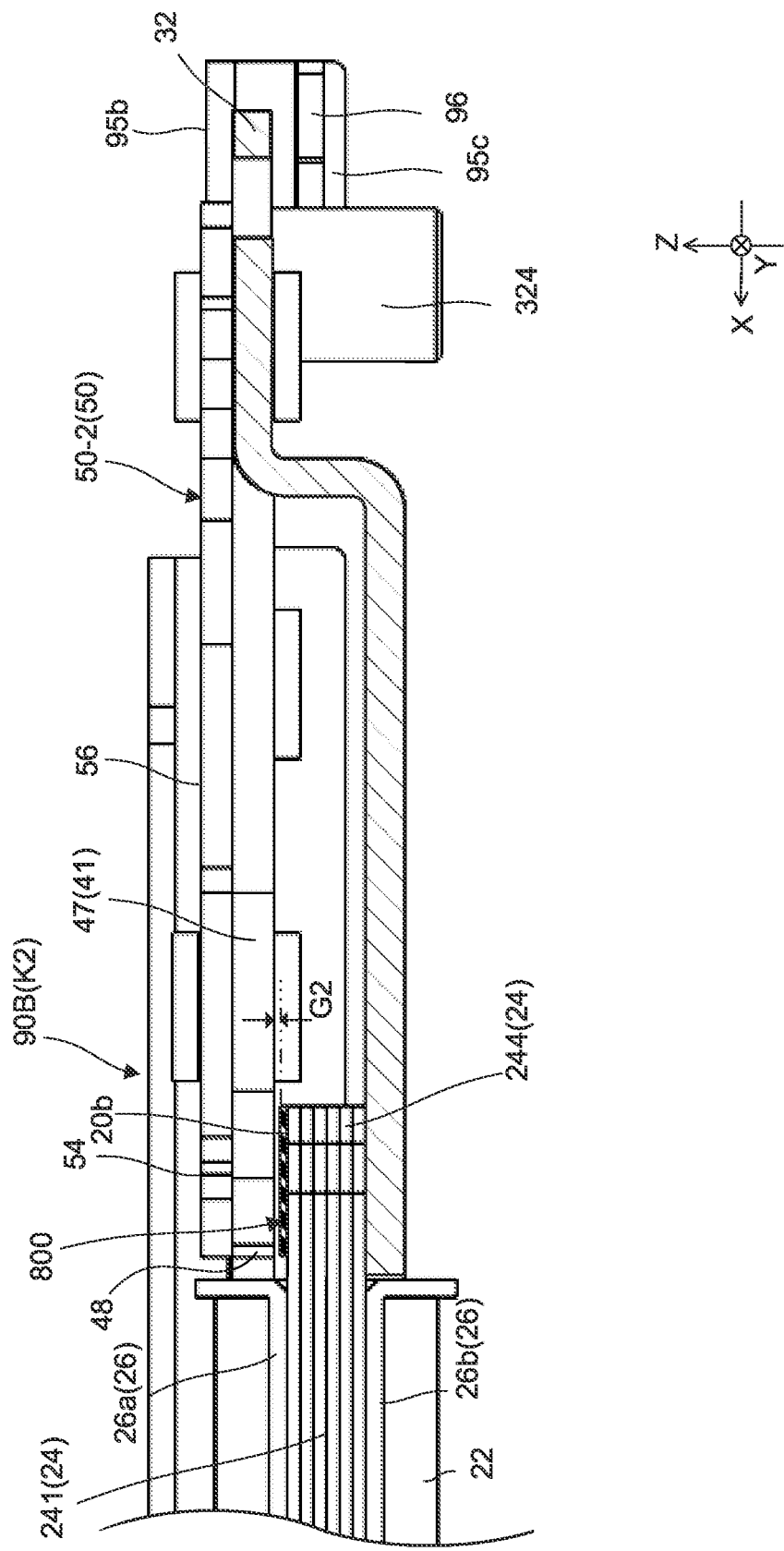
FIG. 19 is a partial cross-sectional view of a main part configuration of the vibration actuator according to Embodiment 2 of the present invention.

FIG. 18 is an exploded perspective view of a vibration actuator according to Embodiment 2 of the present invention. FIG. 19 is a partial cross-sectional view of a main part configuration of the vibration actuator according to Embodiment 2 of the present invention. Note that, FIG. 19 is a partial cross-sectional view obtained by cutting the center of the vibration actuator in the height direction (the Y direction) along the width direction (the X direction).

In vibration actuator 10B, the position at which buffer member 800 is provided is different and the other basic configurations are the same in comparison with vibration actuator 10 (see FIGS. 1 to 5). Accordingly, only different points will be described, and the same points will be denoted by the same reference signs and the same names, and descriptions thereof will be omitted as appropriate. Further, Embodiment 2 will also be described using the orthogonal coordinate system (X, Y, Z) in the same manner. In vibration presenting apparatus 1 illustrated in FIG. 1, vibration actuator 10B can be applied in place of vibration actuator 10.

Vibration actuator 10B includes actuator main body A2 and load detecting part K2. Load detecting part K2 includes strain generating member 90, and strain detecting part 99 provided in strain generating member 90. In the present embodiment, load detecting part K2 has the same function as load detecting part K1.

Actuator main body A2 includes: fixing body 30B including base part 32 and core assembly 20; movable body 40B; and plate-shaped elastic part 50.

Actuator main body A2 is provided with buffer member 800 between magnetic pole parts 242 and 244 of core assembly 20 and attracted surface parts 46 and 47. Magnetic pole parts 242 and 244 of core assembly 20 and attracted surface parts 46 and 47 are portions facing each other in fixing body 30 and movable body 40. Magnetic pole part 242 of core assembly 20 and attracted surface part 46 face each other and magnetic pole part 244 and attracted surface part 47 face each other.

Buffer member 800 is formed of the same material, that is, an elastomer such as silicone rubber or butyl rubber, and has the same function as those of buffer member 80.

Buffer member 800 formed of silicone rubber or butyl rubber is capable of preventing damage due to material deterioration and sustaining its effect in comparison with other materials.

Buffer member 800 is fixed to magnetic pole parts 242 and 244 of core assembly 20 or to attracted surface parts 46 and 47. In the present embodiment, buffer member 800 is fixed to opposite surfaces 20a and 20b of magnetic pole parts 242 and 244. Note that, in base part 32, core assembly 20 does not use screws 68, but uses rivets. Thus, core assembly 20 is fixed to base part 32 in a state in which the surfaces of magnetic pole parts 242 and 244 opposite to attracted surface parts 46 and 47 are flat. Further, magnetic pole parts 242 and 244 and base part 32 may be fixed by adhesion.

Buffer member 800 has a thickness that causes gap G2 to be provided between buffer member 800 and attracted surface parts 46 and 47. Thus, in vibration actuator 10B, even in a case where a force is applied to movable body 40 in a direction in which movable body 40 is pushed down with respect to a strong vibration or impact, magnetic pole parts 242 and 244 and attracted surface parts 46 and 47 do not come into direct contact with each other, and no contact sound is sounded.

Figure 20:
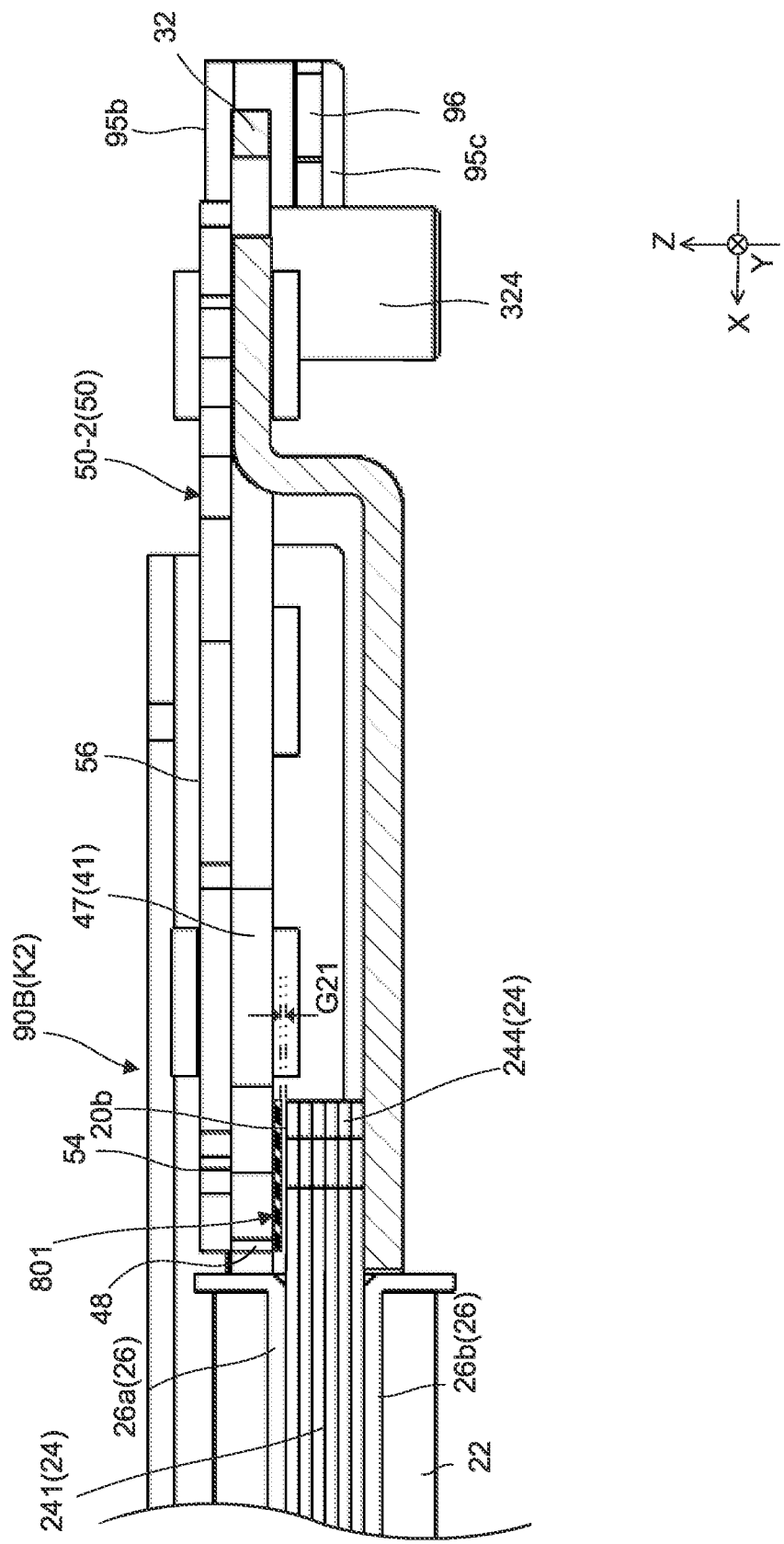
FIG. 20 is a partial cross-sectional view of Variation 1 of the main part configuration of the vibration actuator according to Embodiment 2 of the present invention.

As illustrated in FIG. 20, buffer member 800 may also be provided in magnetic pole parts 242 and 244 of core assembly 20 or in attracted surface parts 46 and 47 the other way around. FIG. 20 is a partial cross-sectional view of Variation 1 of the main part configuration of the vibration actuator according to Embodiment 2 of the present invention. Buffer member 801 illustrated in FIG. 20 which is configured in the same manner as buffer member 800 is fixed to portions of attracted surface parts 46 and 47, where the portions face opposite surfaces 20a and 20b, and gap G21 is provided between buffer member 801 and opposite surfaces 20a and 20b. This configuration makes it possible to obtain the same effect as in the configuration illustrated in FIG. 19.

Figure 21:
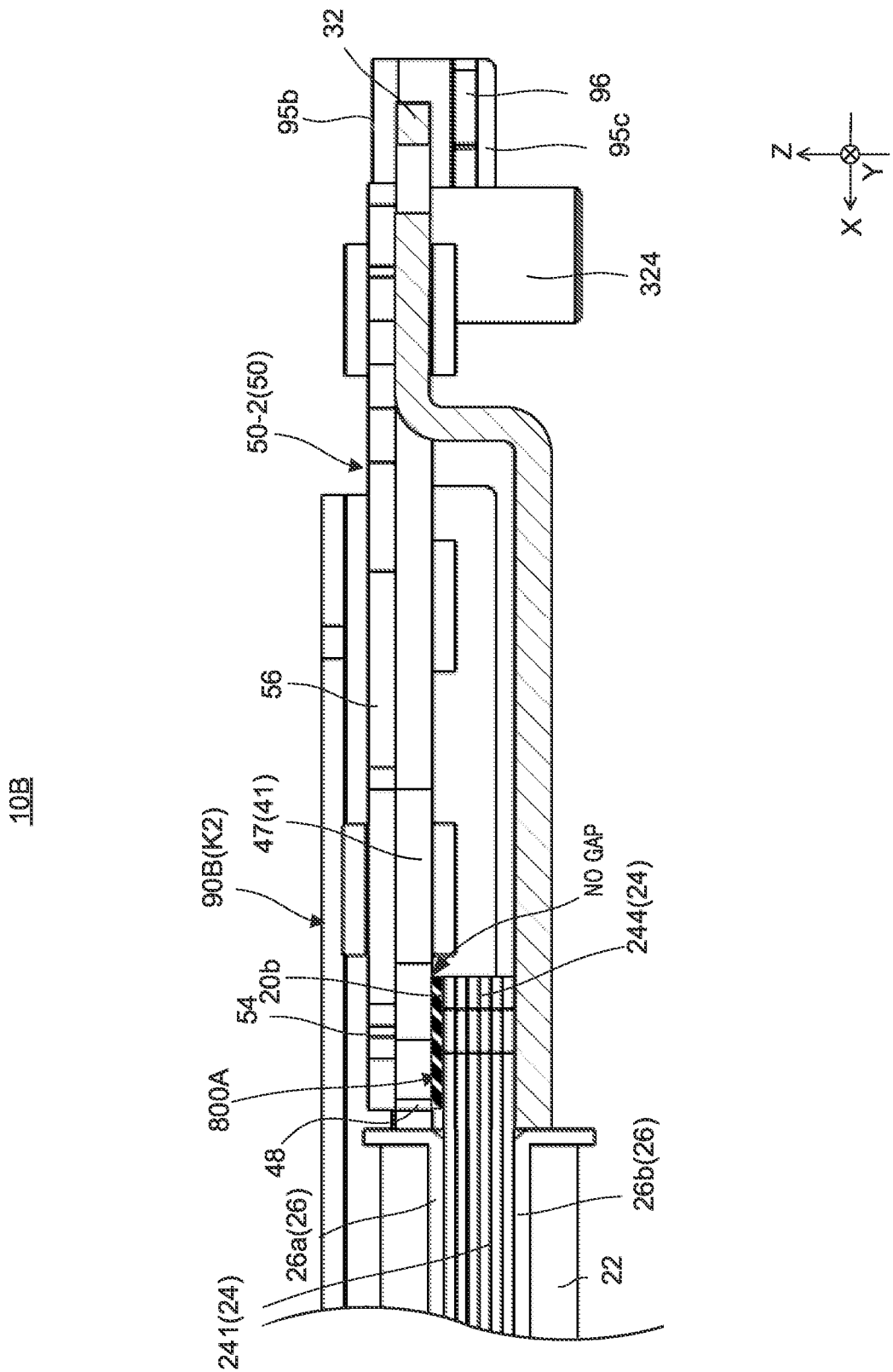
FIG. 21 is a partial cross-sectional view of Variation 2 of the main part configuration of the vibration actuator according to Embodiment 2 of the present invention.

As illustrated in FIG. 21, buffer member 800 may be disposed between magnetic pole parts 242 and 244 and attracted surface parts 46 and 47 without a gap. FIG. 21 is a partial cross-sectional view of Variation 2 of the main part configuration of the vibration actuator according to Embodiment 2 of the present invention. Buffer member 800A illustrated in FIG. 21 is fixed to magnetic pole parts 242 and 244 such that there is no gap between magnetic pole parts 242 and 244 and attracted surface parts 46 and 47. This configuration makes it possible to obtain the same effect as in the configuration illustrated in FIG. 19.

The embodiments of the present invention have been described thus far. Note that, the above description is only examples of the preferred embodiments of the present invention, and the scope of the present invention is not limited thereto. That is, the descriptions of the configuration of the apparatus and the shape of each portion of the apparatus are examples, and it is apparent that various modifications and additions to these examples are possible in the scope of the invention.

For example, in the configurations of vibration actuator 10 and 10B of the embodiments described above, rivets may be used instead of screws 62, 64, 68 (screw 68 is not used in vibration actuator 10B), and 69 as the fastening members. Each rivet includes a body part without a head part and a screw part, is inserted into holed members, and joins the holed members together when the opposite end part of each rivet is plastically deformed by caulking. Specifically, rivets may be used for fixing base part 32 or 32B and plate-shaped elastic part 50 and for fixing plate-shaped elastic part 50 and movable body 40 or 40B, for example. The caulking may be performed using, for example, a press machine, a dedicated tool, or the like.

Further, based on strain data obtained by strain sensors 99-1 to 99-4, the input pulse period may be corrected using individual differences among the components in vibration actuators 10 and 10B.

INDUSTRIAL APPLICABILITY

The vibration actuator and the vibration presenting apparatus according to the present invention exhibit an effect of capable of achieving an improved impact resistance and a reduced sound, and are useful for operation devices such as a touch display apparatus in which a touch screen apparatus is mounted, for example.

REFERENCE SIGNS LIST

1 Vibration presenting apparatus
2 Touch screen (vibration presenting part)
2a Screen (operation surface)
10, 10B Vibration actuator
12 Switching element
14 Signal generation
20 Core assembly
20a, 20b Opposite surface
22 Coil
24 Core
26 Bobbin
26a, 26b Divided body
28, 321, 322 Fixing hole
30, 30B Fixing body
32, 32B Base part
32a Attachment part
32b Bottom surface part
33 Fastening hole
35 Engaged part
36 Opening part
40, 40B Movable body (movable part)
41 Yoke
42 Surface-part fixing hole
44 Surface-part fixing part
44a Fixing surface
46, 47 Attracted surface part (support-part side fixing part)
48 Opening part
49 Notch
50, 50-1, 50-2 Plate-shaped elastic part (elastic support part)
52 Fixing-body side fixing part
54 Movable-body side fixing part
56 Elastic arm part
62, 64, 68, 69 Screw
80, 80A, 81, 800, 800A, 801 Buffer member
90, 90B Strain generating member
92 Movable-body side fixing part (support-part side fixing part)
94 Presentation-part side fixing part
95a Main body frame part
95b Connecting-arm part
95c Rib
96 Movement regulating part
97 Strain part
99 Strain detecting part
99-1, 99-2, 99-3, 99-4 Strain sensor
241 Core main body
242, 244 Magnetic pole part
942 Fixing hole
A1, A2 Actuator main body
K1, K2 Load detecting part (movable part)

The invention claimed is:
1. A vibration actuator, comprising:
a movable part that gives vibration to a vibration presenting part that receives a pressing operation;
a vibration generating part that generates the vibration of the movable part in accordance with the pressing operation;
a base part; and an elastic support part that supports the movable part with respect to the base part in a vibratable manner in an approaching/separating direction, wherein the movable part includes:
- a load detecting part provided between a presentation-part side fixing part and a support-part side fixing part and detecting, as a load, strain due to the pressing operation, the presentation-part side fixing part being fixable to the vibration presenting part, the support-part side fixing part being fixed to the elastic support part; and
- a movement regulating part provided on a side of the presentation-part side fixing part rather than the load detecting part, the movement regulating part regulating movement of the movable part by engaging with an engaged part of the base part via a buffer member when the movable part moves in a direction separating from the base part.

2. The vibration actuator according to claim 1, wherein:
the movable part is configured such that when the movable part moves in the direction separating from the base part, the movement regulating part approaches the engaged part while moving in the direction separating from the base part, and
the buffer member is disposed between the movement regulating part and the engaged part.

3. The vibration actuator according to claim 1, wherein the buffer member is provided in the movement regulating part while being separated from the engaged part so as to abut on the engaged part when the movement regulating part moves in the direction separating from the base part.

4. The vibration actuator according to claim 1, wherein the buffer member is provided in the engaged part while being separated from the movement regulating part so as to abut on the movement regulating part when the movement regulating part moves in the direction separating from the base part.

5. The vibration actuator according to claim 1, wherein the buffer member is provided so as to fill a gap between the engaged part and the movement regulating part.

6. The vibration actuator according to claim 1, wherein:
the movable part includes a magnetic material,
the vibration generating part is disposed to face the magnetic material in the approaching/separating direction, and includes an attraction part that generates the vibration by electromagnetically attracting the magnetic material, and
the buffer member is provided in one of the magnetic material and the attraction part with a gap between the buffer member and another of the magnetic material or the attraction part.

7. The vibration actuator according to claim 1, wherein:
the movable part includes a magnetic material,
the vibration generating part is disposed to face the magnetic material in the approaching/separating direction, and includes an attraction part that generates the vibration by electromagnetically attracting the magnetic material, and
the buffer member is provided so as to fill a gap between the magnetic material and the attraction part.

8. The vibration actuator according to claim 1, wherein the buffer member is an elastomer.

9. The vibration actuator according to claim 8, wherein the buffer member includes silicone rubber or butyl rubber.

10. The vibration actuator according to claim 1, wherein the movement regulating part is disposed near the presentation-part side fixing part or in the presentation-part side fixing part.

11. A vibration presenting apparatus, comprising:
the vibration actuator according to claim 1; and
a touch screen as the vibration presenting part.

* * * * *